United States Patent [19]
Radkowsky

[11] Patent Number: 5,864,593
[45] Date of Patent: Jan. 26, 1999

[54] SEED-BLANKET REACTORS

[75] Inventor: Alvin Radkowsky, Ramat Chen, Israel

[73] Assignee: Radkowsky Thorium Power Corporation, New York, N.Y.

[21] Appl. No.: 18,472

[22] Filed: Feb. 4, 1998

Related U.S. Application Data

[60] Division of Ser. No. 516,130, Aug. 17, 1995, Pat. No. 5,737,375, which is a continuation-in-part of Ser. No. 288,749, Aug. 16, 1994, abandoned.

[51] Int. Cl.$^6$ ...................................................... G21C 1/00
[52] U.S. Cl. .............................................................. 376/173
[58] Field of Search .................................... 376/171, 172, 376/173, 209, 212, 213, 267, 333

[56] References Cited

U.S. PATENT DOCUMENTS

| | | |
|---|---|---|
| T947,011 | 6/1976 | Radkowsky . |
| 2,898,281 | 8/1959 | Untermyer et al. . |
| 3,151,031 | 9/1964 | Lindstrom . |
| 3,154,471 | 10/1964 | Radkowsky . |
| 3,219,535 | 11/1965 | Robbins . |
| 3,309,277 | 3/1967 | Jaye et al. . |
| 3,335,060 | 8/1967 | Diener . |
| 3,671,392 | 6/1972 | Beaudoin et al. . |
| 3,859,165 | 1/1975 | Radkowsky et al. . |
| 3,957,575 | 5/1976 | Fauth, Jr. et al. . |
| 3,960,655 | 6/1976 | Bohanan et al. . |
| 3,998,692 | 12/1976 | Bohanan et al. . |
| 4,169,760 | 10/1979 | Bevilacqua . |
| 4,273,613 | 6/1981 | Radkowsky . |
| 4,609,522 | 9/1986 | Davidson et al. . |
| 4,678,619 | 7/1987 | Radkowsky . |
| 4,820,478 | 4/1989 | Freeman . |
| 4,879,086 | 11/1989 | Luce et al. . |
| 4,941,158 | 7/1990 | Bingham et al. . |
| 4,968,476 | 11/1990 | Radkowsky . |

FOREIGN PATENT DOCUMENTS

| | | |
|---|---|---|
| WO 85/01826 | 4/1985 | WIPO . |
| WO 93/16477 | 8/1993 | WIPO . |

OTHER PUBLICATIONS

Bilateral Seminars of the International Bereau Kernforschungsanlagejulich GmbH, "Program of Research and Development on the Thorium Utilization of PWRs", Final Report, 1979–1988.

International Atomic Energy Agency, "Advanced Fuel Technology and Performance," IAEA–TECDOC–352, Vienna, 1985.

International Atomic Energy Agency, "Thorium–Based Nuclear Fuel: Current Status and Perspectives," IAEA–TECDOC–412, Vienna, 1987.

Radkowsky, A. et al., "The Optimaztion of the Once–Through Uranium Cycle for Pressurized Light Water Reactor," Nuclear Science and Engineering, pp. 265–274, 1980.

*Primary Examiner*—Daniel D. Wasil
*Attorney, Agent, or Firm*—Jones, Tullar & Cooper

[57] ABSTRACT

Seed-blanket type nuclear reactor cores (10,100) are employed to burn thorium fuel with conventional reactor fuels, including nonproliferative enriched uranium, and weapons or reactor grade plutonium. In a first embodiment, the core (10) is completely nonproliferative in that neither the reactor fuel, nor the generated waste material, can be used to manufacture nuclear weapons. In a second embodiment of the invention, the core (100) is employed to burn large amounts of weapons grade plutonium with the thorium, and provides a convenient mechanism by which stockpiled weapons grade plutonium can be destroyed and converted into electrical energy. The cores of both embodiments are comprised of a plurality of seed-blanket units (12, 102) which have centrally located seed regions (18,104) that are surrounded by annular blanket regions (20,106). The seed regions contain the uranium or plutonium fuel rods (22,110), while the blanket regions contain thorium fuel rods (26,118). The moderator/fuel volume ratios and relative sizes of the seed and blanket regions are optimized so that neither embodiment generates waste materials that can be employed for manufacturing nuclear weapons. A novel refueling scheme is also employed with the first embodiment to maximize seed fuel utilization, and further insure that the spent fuel cannot be employed for manufacturing nuclear weapons.

20 Claims, 14 Drawing Sheets

- ⊙ Seed Fuel Cell
- ⊛ Blanket Fuel Cell
- ○ Water Tube
- ⊗ Center Tube

- ⊙ Seed Fuel Cell
- ⊛ Blanket Fuel Cell
- ⊘ WABA
- ⊗ Center Tube
- ⊚ Gd/Fuel Rod

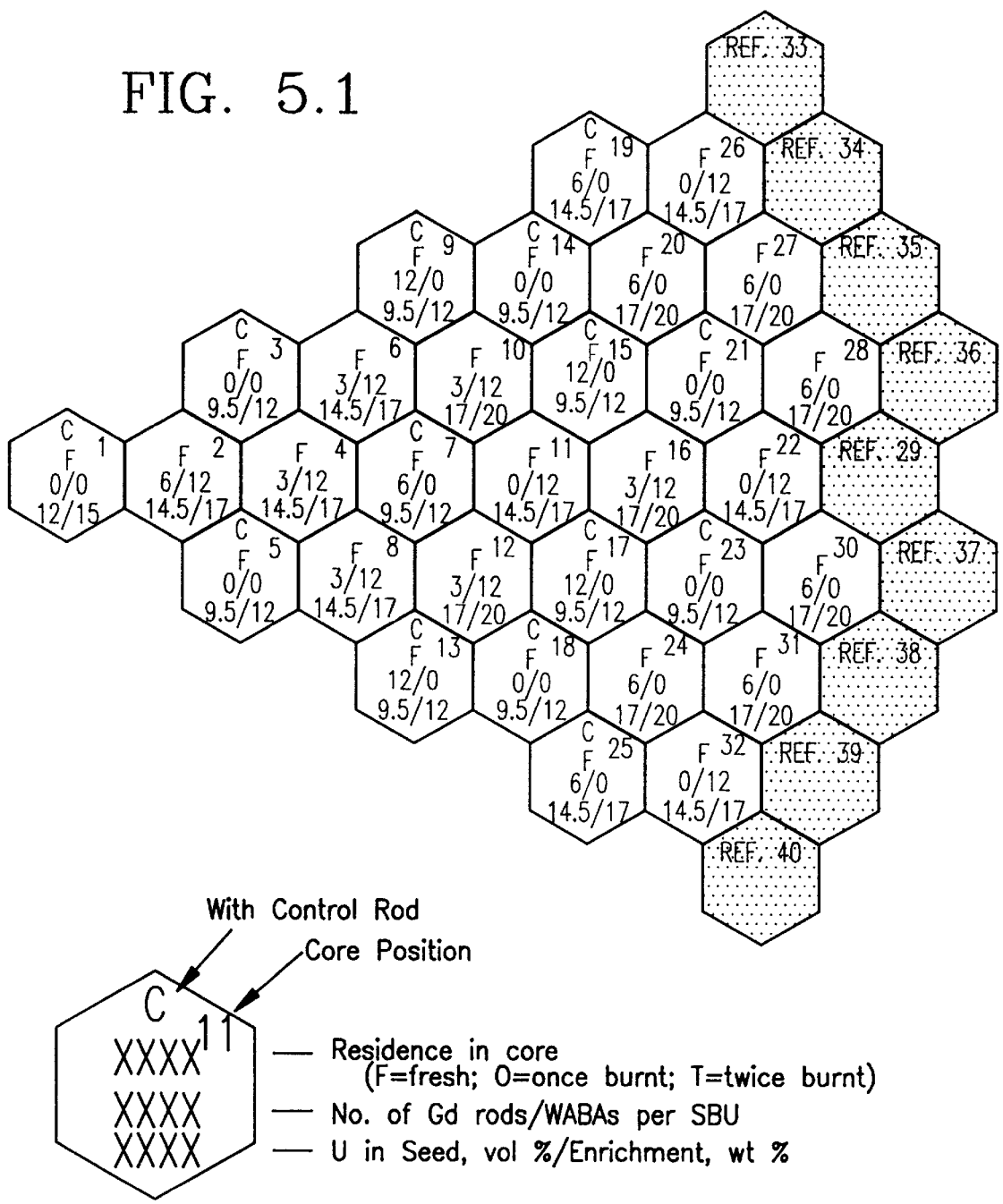
FIG. 5.1

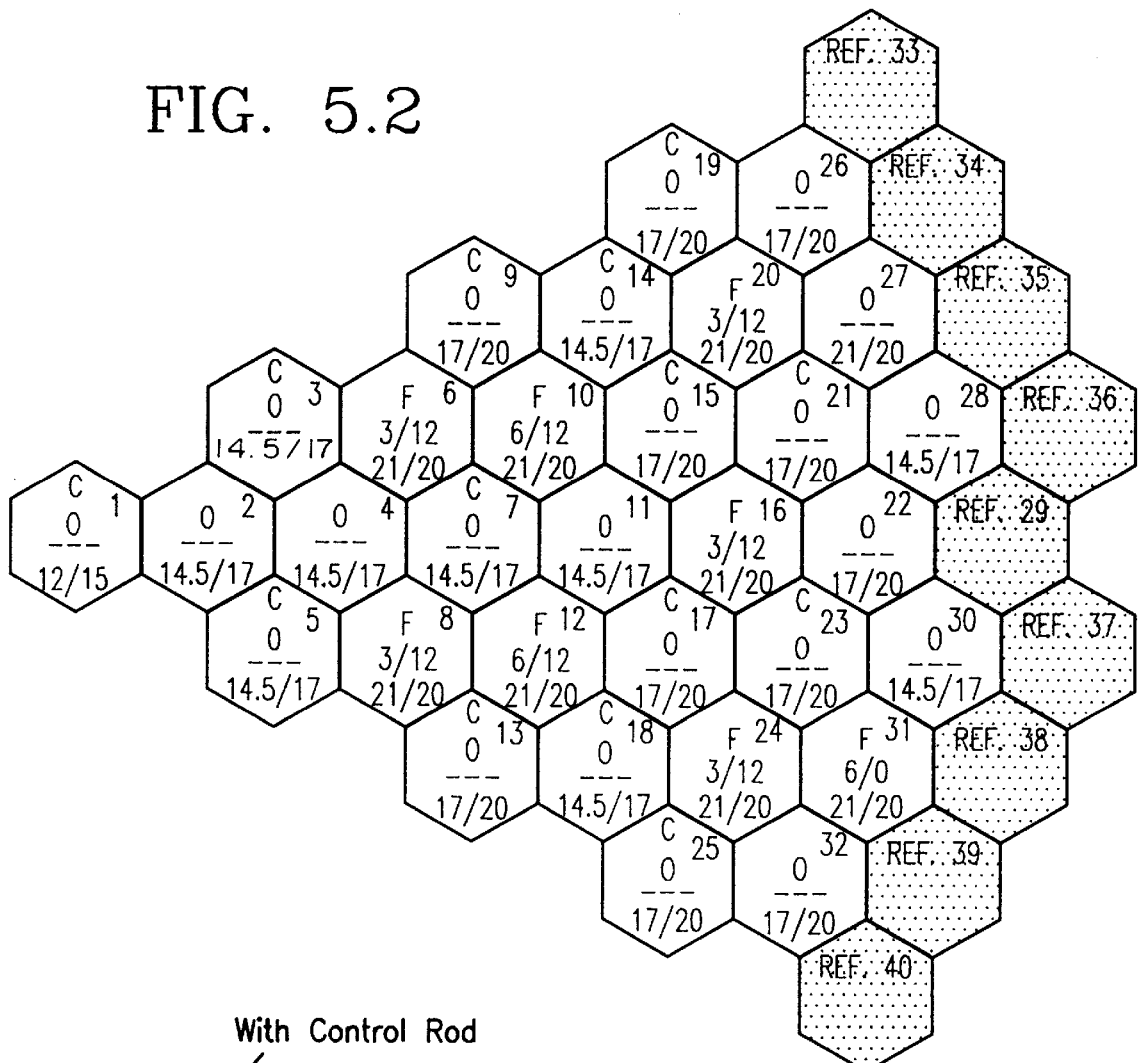
FIG. 5.2
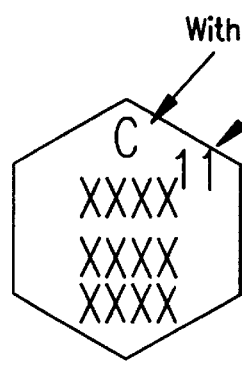
With Control Rod
Core Position
— Residence in core
(F=fresh; O=once burnt; T=twice burnt)
— No. of Gd rods/WABAs per SBU
— U in Seed, vol %/Enrichment, wt %

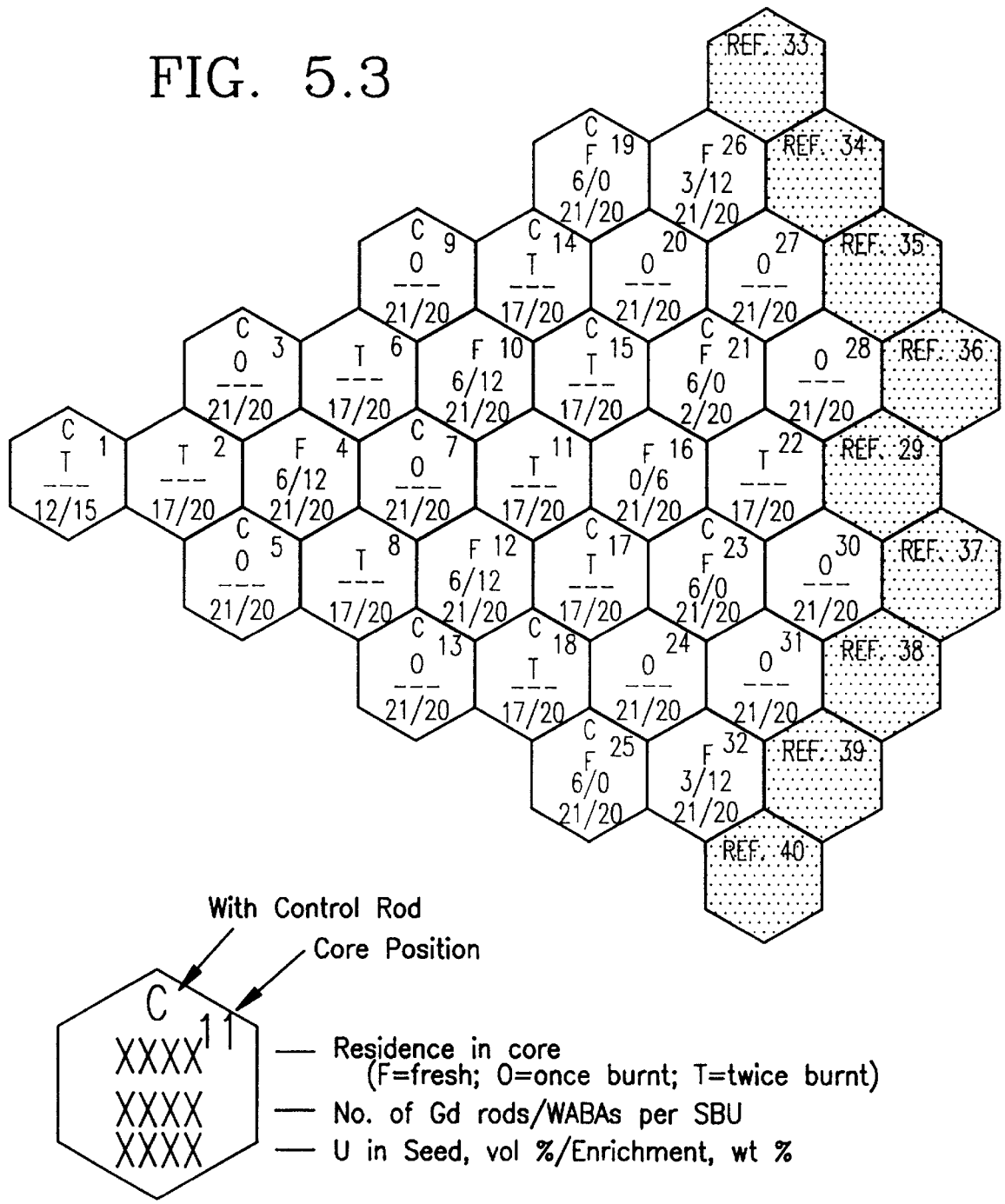
FIG. 5.3

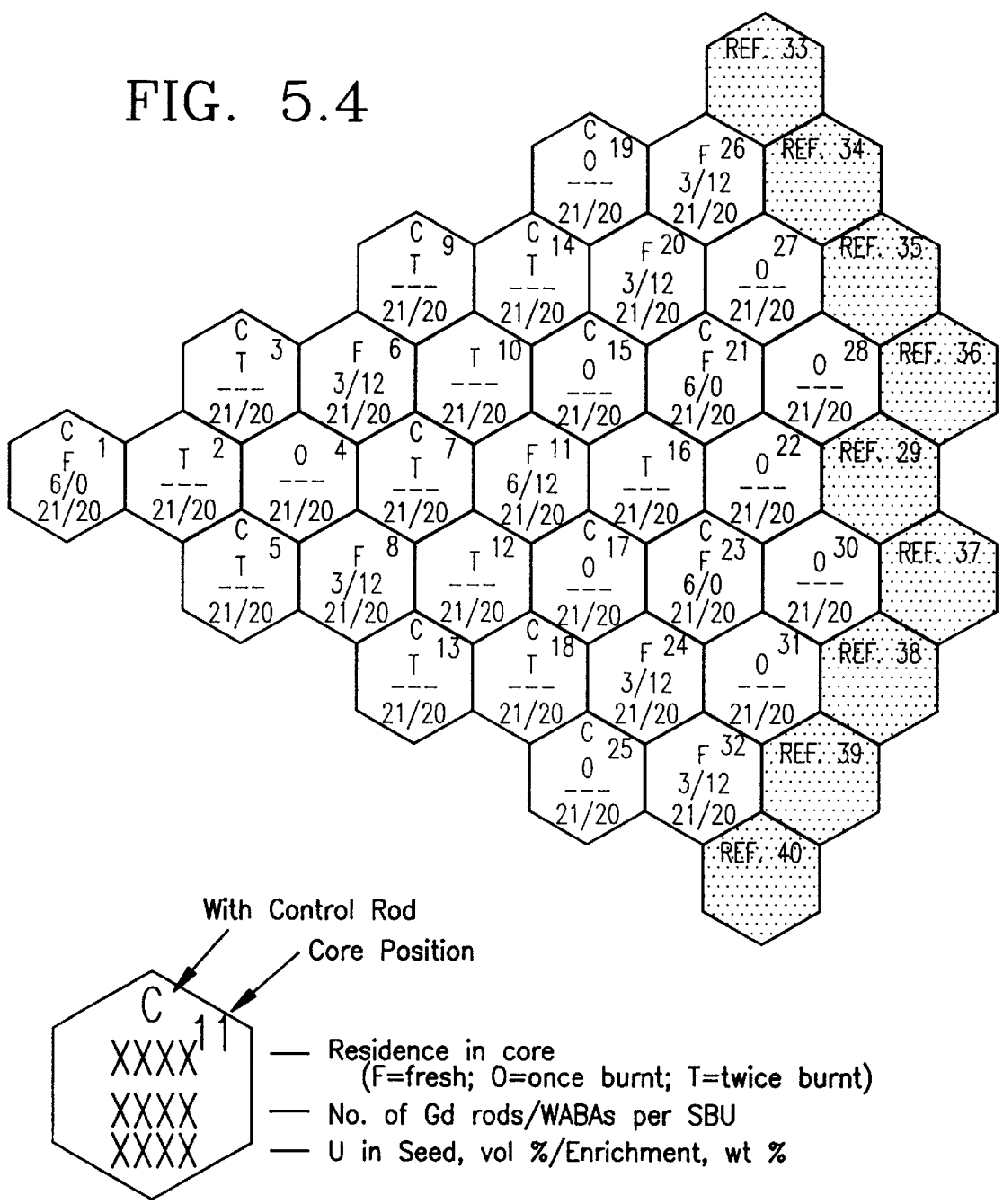
FIG. 5.4

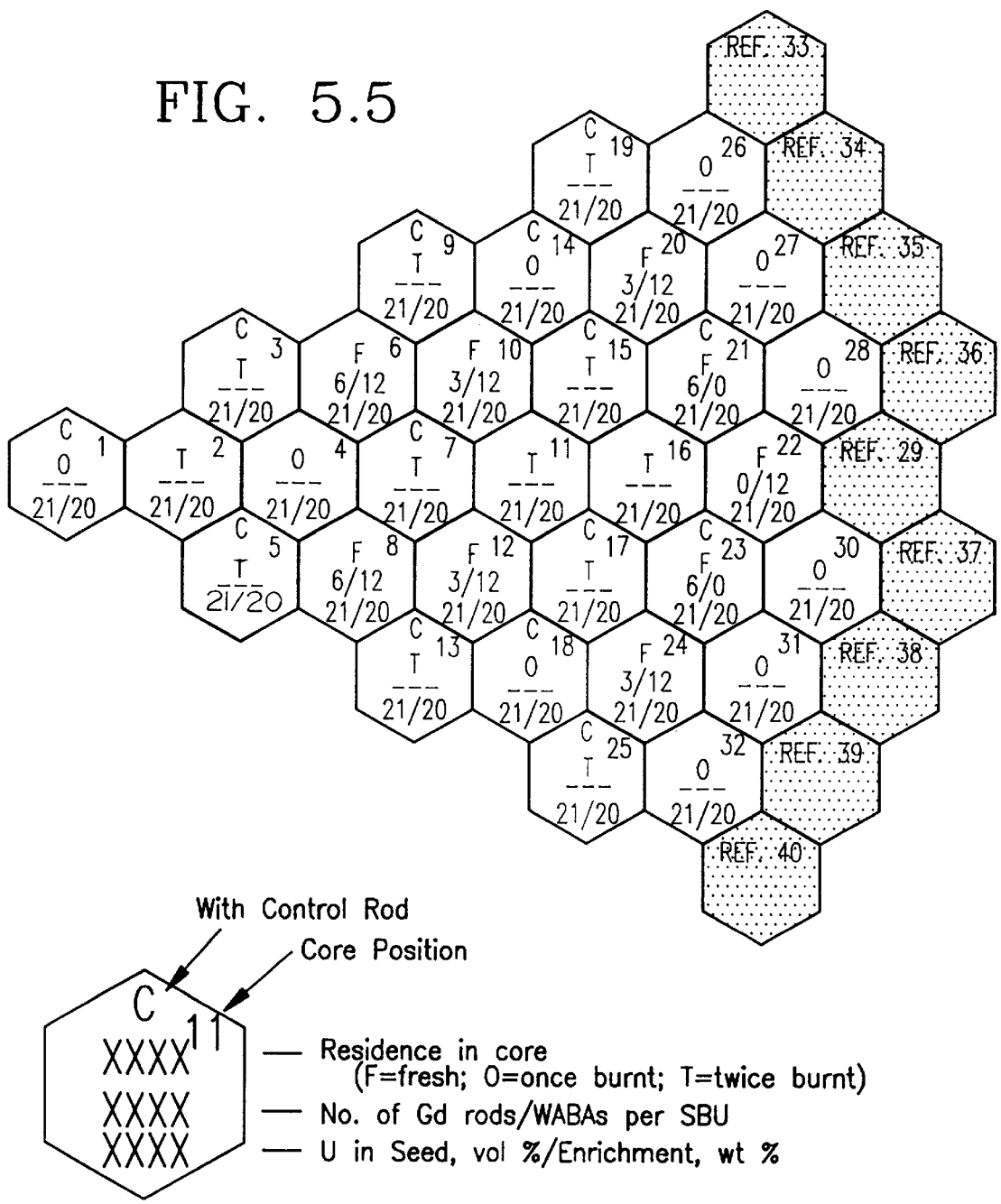
FIG. 5.5

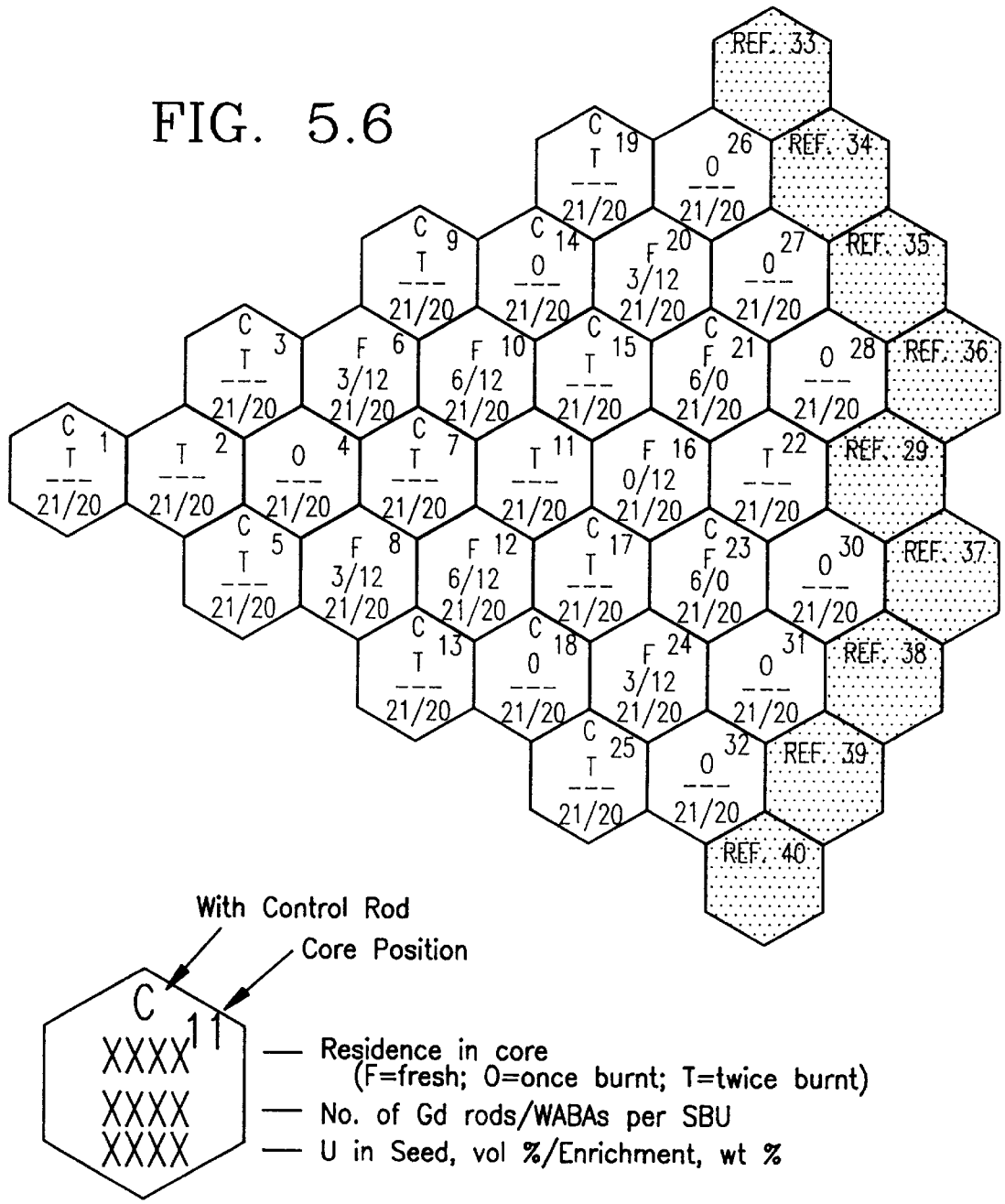
FIG. 5.6

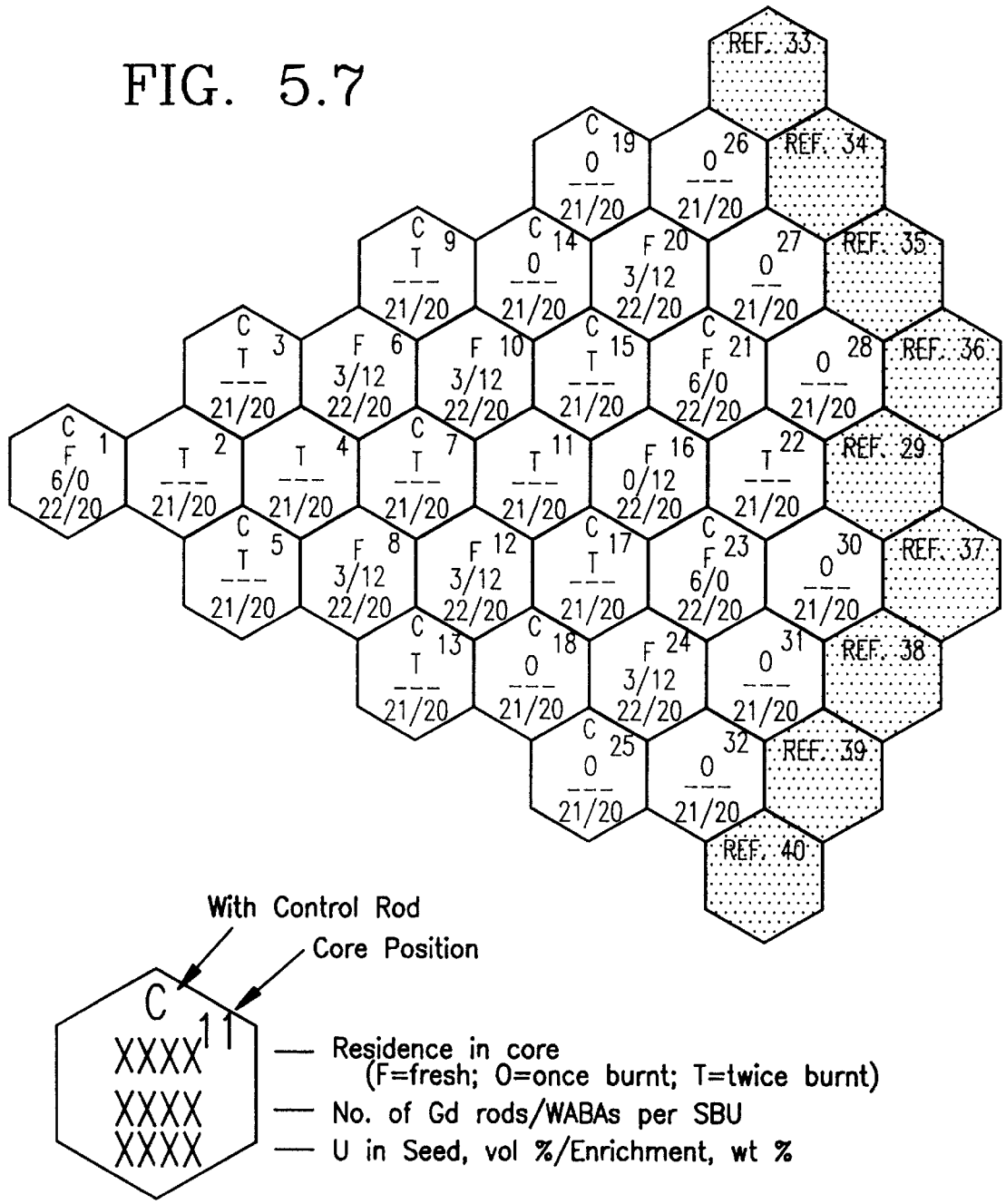
FIG. 5.7

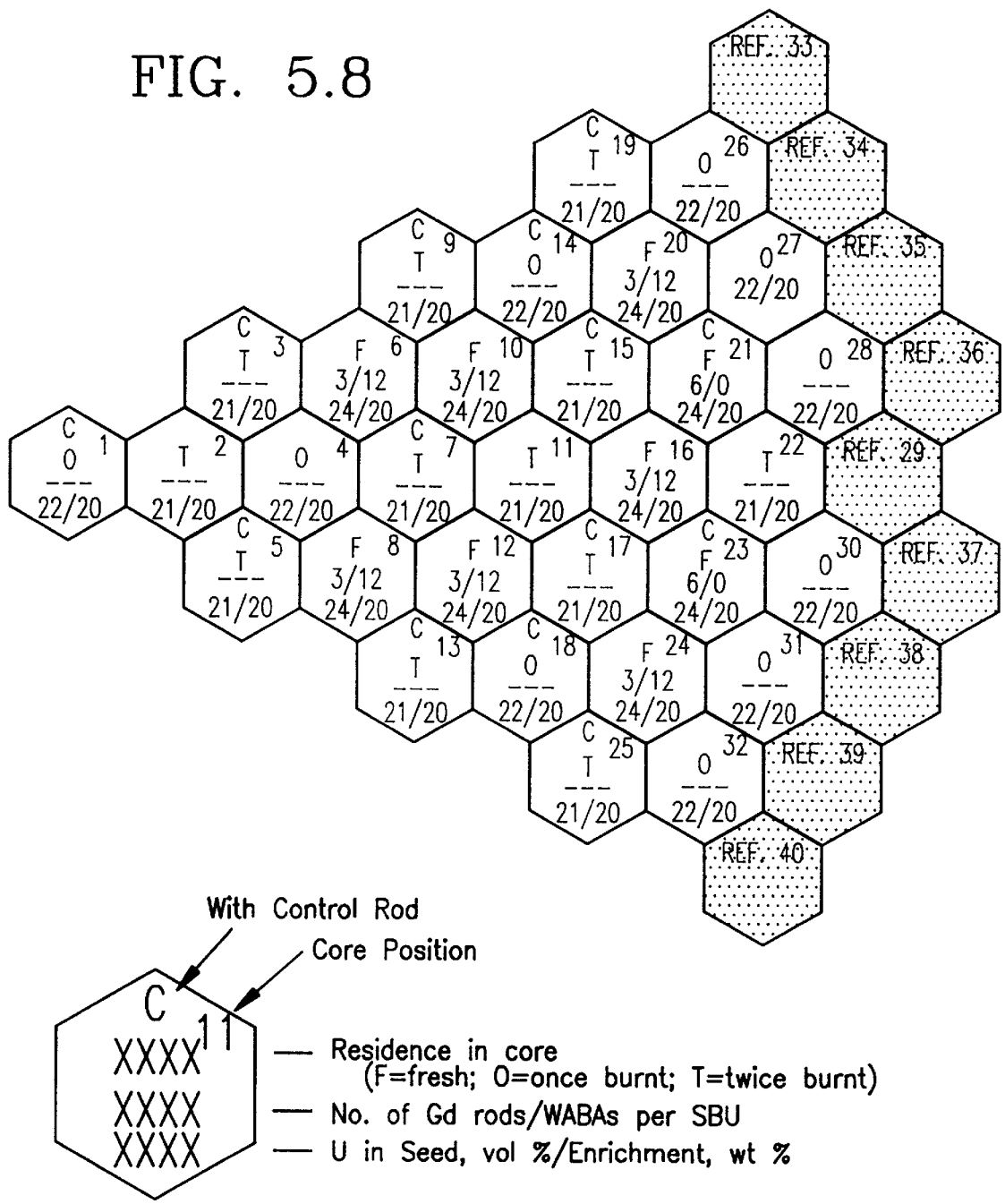
FIG. 5.8

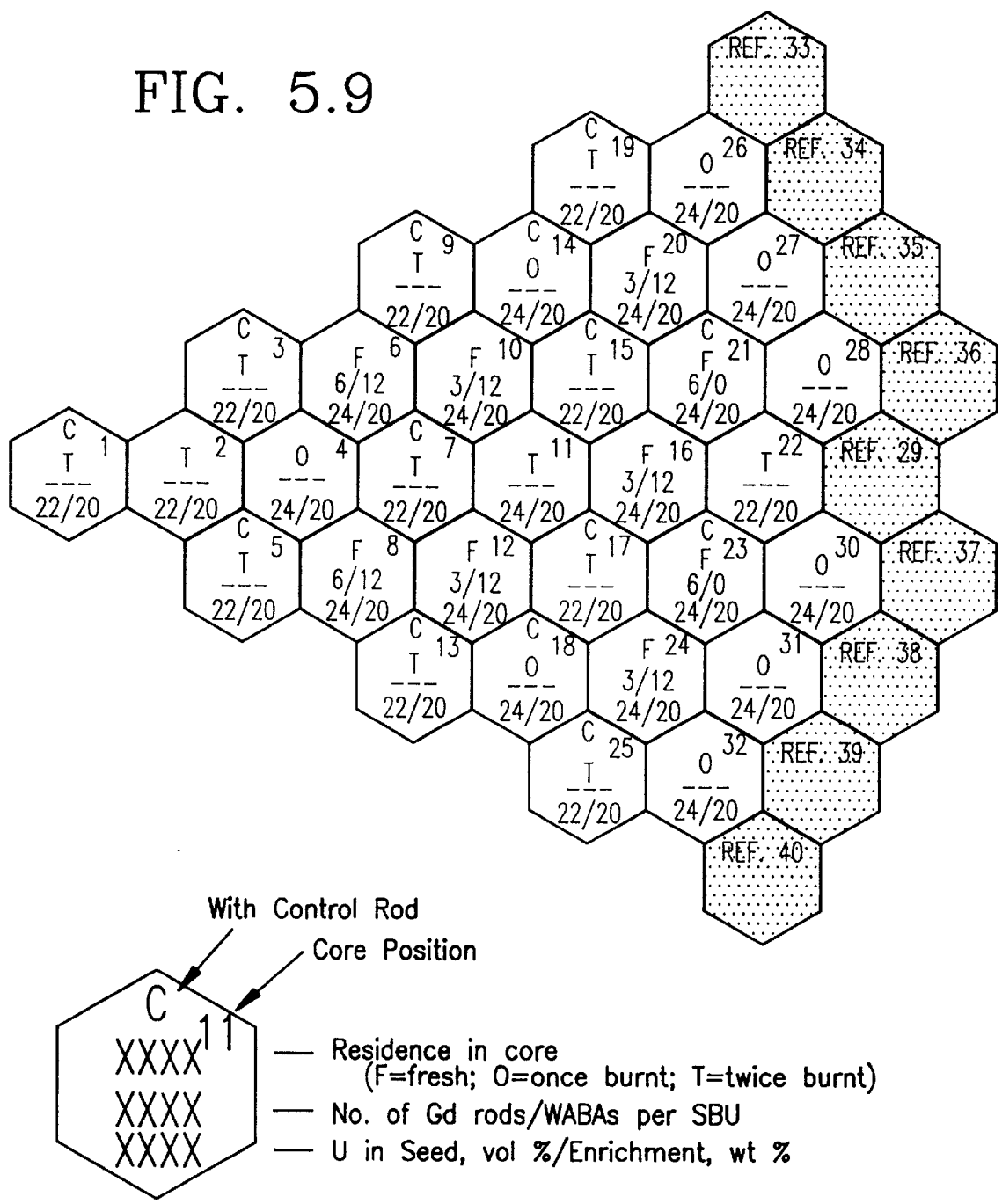
FIG. 5.9

○ Seed Fuel Rod 110
⊙ Seed Pu/Gd BP Rod 114
⊘ Water Hole 112
⊖ Blanket Fuel Rod 118
⬢ WABA BP Rod 116

EQUILIBRIUM CYCLE

| A | Fuel Assembly Type |
| 11.5 | Bumup at BOC, GWD/T |
| 29.9 | Bumup at EOC, GWD/T |

SEED-BLANKET REACTORS

CROSS-REFERENCE TO RELATED APPLICATIONS

This application is division of application Ser. No. 08/516,130, filed Aug. 17, 1995, now U.S. Pat. No. 5,737,375, which is a continuation-in-part of application Ser. No. 08/288,749, filed Aug. 16, 1994, now abandoned.

TECHNICAL FIELD

The present invention relates in general to light water nuclear reactor designs which employ thorium as a fuel. The reactors can burn with the thorium, nonproliferative enriched uranium, weapons grade plutonium or reactor grade plutonium.

BACKGROUND ART

Nuclear power remains an important energy resource throughout the world today. Many countries without sufficient indigenous fossil fuel resources rely heavily on nuclear power for the production of electricity. For many other countries, nuclear energy is used as a competitive electricity producer that also diversifies their energy mix. Further, nuclear power also makes a very important contribution to the goals of controlling fossil fuel pollution (e.g., acid rain, global warming), and conservation of fossil fuels for future generations. In terms of numbers, nuclear power provides approximately 11% of the world's electricity. At the end of 1994, there were 424 nuclear power plants in 37 countries. Plants under construction will bring this number to approximately 500 plants by the end of the decade.

Although safety is certainly a major concern in the design and operation of nuclear reactors, another major concern is the threat of proliferation of materials which could be used in nuclear weapons. This is of particular concern in countries with unstable governments whose possession of nuclear weapons could pose a significant threat to world security. Nuclear power must therefore be designed and used in a manner which does not cause proliferation of nuclear weapons, and the resulting risk of their use.

Unfortunately, all present nuclear power reactors create large amounts of what is known as reactor grade plutonium. For example, a typical 1,000 MWe reactor creates on the order of 200–300 kg per year of reactor grade plutonium. It is not difficult to reprocess this discharged reactor grade plutonium into weapons grade plutonium, and only approximately 7.5 kg of reactor grade plutonium is required to manufacture a single nuclear weapon. Accordingly, the fuel discharged from the cores of conventional reactors is highly proliferative, and safeguards are required to insure that the discharged fuel is not acquired by unauthorized individuals. A similar security problem exists with the vast stockpiles of weapons grade plutonium which have been created as the U.S. and the countries of the former U.S.S.R. have dismantled their nuclear weapons.

Other problems involved with the operation of conventional nuclear reactors concern permanent disposal of long term radioactive waste products, as well as the quickly diminishing worldwide supply of natural uranium ore. Regarding the former, government owned repository spaces are virtually nonexistent and the Yucca Flats project located in the United States has now been delayed by Congress. As to the latter, significant problems with supplies of natural uranium ore are foreseen within the next 50 years.

As a result of the foregoing problems, attempts have been made in the past to construct nuclear reactors which operate on relatively small amounts of nonproliferative enriched uranium (enriched uranium having a U-235 content of 20% or less), and do not generate substantial amounts of proliferative materials, such as plutonium. Examples of such reactors are disclosed in my two previous international applications, Nos. PCT/US84/01670, published on 25 Apr. 1985 under International Publication No. WO 85/01826, and PCT/US93/01037, published on 19 Aug. 1993 under International Publication No. WO 93/06477. The '826 and '477 applications both disclose seed-blanket reactors which derive a substantial percentage of their power from thorium fueled blankets. The blankets surround an annular seed section which contains fuel rods of nonproliferative enriched uranium. The uranium in the seed fuel rods releases neutrons which are captured by the thorium in the blankets, thereby creating fissionable U-233 which burns in place, and generates heat for powering the reactor.

The use of thorium as a nuclear reactor fuel in the foregoing manner is attractive because thorium is considerably more abundant in the world than is uranium. In addition, both of the reactors disclosed in the '826 and '477 applications claimed to be nonproliferative in the sense that neither the initial fuel loading, nor the fuel discharged at the end of each fuel cycle, is suitable for use in the manufacture of nuclear weapons. This is accomplished by employing only nonproliferative enriched uranium as the seed fuel, selecting moderator/fuel volume ratios which minimize plutonium production and adding a small amount of nonproliferative enriched uranium to the blanket whose U-238 component uniformly mixes with the residual U-233 at the end of the blanket cycle, and "denatures" the U-233, thereby rendering it useless for manufacture of nuclear weapons.

Unfortunately, Applicant has discovered through continued research that neither of the reactor designs disclosed in the aforementioned international applications is truly nonproliferative. In particular, it has now been discovered that both of these designs result in a higher than minimum production of proliferative plutonium in the seed due to the annular seed arrangement. The use of the annular seed with both an inner, central blanket section and an outer, surrounding blanket section cannot be made nonproliferative because the thin, annular seed has a correspondingly small "optical thickness" which causes the seed spectrum to be dominated by the much harder spectrum of the inner and outer blanket sections. This results in a greater fraction of epithermal neutrons and a higher than minimum production of proliferative plutonium in the seed.

Both of these previous reactor designs are also not optimized from an operational parameter standpoint. For example, moderator/fuel volume ratios in the seed and blanket regions are particularly crucial to minimize plutonium production in the seed, permit adequate heat removal from the seed fuel rods and insure optimum conversion of thorium to U-233 in the blanket. Further research indicates that the preferred moderator/fuel ratios disclosed in these international applications were too high in the seed regions and too low in the blanket regions.

The previous reactor core designs were also not particularly efficient at consuming the nonproliferative enriched uranium in the seed fuel elements. As a result, the fuel rods discharged at the end of each seed fuel cycle contained so much residual uranium that they needed to be reprocessed for reuse in another reactor core.

The reactor disclosed in the '477 application also requires a complex mechanical reactor control arrangement which makes it unsuitable for retrofitting into a conventional reactor core. Similarly, the reactor disclosed in the '826 application cannot be easily retrofitted into a conventional core either because its design parameters are not compatible with the parameters of a conventional core.

Finally, both of the previous reactor designs were designed specifically to burn nonproliferative enriched uranium with the thorium, and are not suitable for consuming large amounts of plutonium. Thus, neither of these designs provides a solution to the stockpiled plutonium problem.

DISCLOSURE OF INVENTION

In view of the foregoing, it is an object of the present invention to provide improved seed-blanket reactors which provide optimum operation from both an economic and a nonproliferative standpoint.

It is a further object of the present invention to provide seed-blanket reactors which can be easily retrofitted into conventional reactor cores.

It is another object of the present invention to provide a seed-blanket reactor which can be utilized to consume large quantities of plutonium with thorium, without generating proliferative waste products.

A still further object of the present invention is to provide seed-blanket reactors which produce substantially reduced amounts of high level radioactive wastes, thereby resulting in a significant reduction in long term waste storage space requirements.

The foregoing and other objects of the invention are achieved through provision of improved seed-blanket reactors which utilize thorium fuel in combination with either uranium or plutonium fuel. The first preferred embodiment of the present invention comprises an improved version of the nonproliferative reactor disclosed in the '477 application. Through the use of specific moderator to fuel ratios and a novel refueling scheme, this embodiment of the invention achieves a fuel burn up efficiency which has heretofore been impossible to achieve in any known reactors, and generates only nuclear wastes that are incapable of being used for formation of nuclear weapons. A second preferred embodiment of the invention is designed specifically for consuming large quantities of both reactor grade discharge plutonium and weapons grade plutonium in a fast, efficient manner. Again, the waste material generated thereby cannot be employed for forming nuclear weapons.

The first embodiment of the invention is known as the nonproliferative light water thorium reactor, and is so named because neither its fuel nor its waste products can be employed for forming nuclear weapons. The nonproliferative reactor's core is comprised of a plurality of seed-blanket units (SBUs), each of which includes a centrally located seed region and a surrounding, annular blanket region. The SBUs are specifically designed to be easily retrofitted in place of fuel assemblies of a conventional reactor core.

The seed regions in the SBUs have a multiplication factor greater than 1, and contain seed fuel elements of enriched uranium with a ratio of U-235 to U-238 equal to or less than 20% U-235 to 80% U-238, this being the maximum ratio which is considered to be nonproliferative. The enriched uranium is preferably in the form of rods and/or plates consisting of uranium-zirconium alloy (uranium-zircalloy) or cermet fuel (uranium oxide particles embedded in a zirconium alloy matrix).

The blanket regions have a multiplication factor less than 1, and contain blanket fuel elements essentially comprising Th-232 with a small percentage of enriched uranium (again enriched as high as 20% U-235) to assist the seed in providing reactor power during the initial stages of operation when the thorium is incapable of providing power on its own. By adding enriched uranium to the blanket, the blanket can generate approximately the same fraction of power at start up that it does later when a large number of neutrons released by the seed fuel elements have been absorbed by the thorium fuel elements in the blanket. This absorption generates fissionable U-233 which is burned in place, and provides power from the blanket once the reactor is up and running.

The 20% enriched uranium oxide in the blanket also serves to denature any residual U-233 left in the blanket at the end of its lifetime by uniformly mixing the U-233 with nonfissionable uranium isotopes including U-232, U-234, U-236 and U-238. This denaturing is important because it is nearly impossible to separate the residual U-233 from the nonfissile isotopes thus making the residual U-233 unsuitable for use in the formation of nuclear weapons.

Light water moderator is employed in both the seed and blanket regions of each SBU to control reactivity. Unlike in conventional uranium cores, boron is not dissolved in the water moderator during power operation because this would unacceptably lower the multiplication factor of the blanket, thus resulting in a drastically lower blanket power fraction.

The volume ratios of the water moderator to fuel in each region are crucial. In the seed region, to insure that the reactor will not generate sufficient amounts of plutonium waste to be considered proliferative, the moderator/fuel ratio must be as high as practicable to slow down the neutrons in the seed, and decrease the likelihood that they will be absorbed by the uranium-238 in the seed, thereby generating plutonium. Unfortunately, to increase the moderator volume in the seed naturally implies that the fuel volume must be correspondingly decreased, and this increases the power density which, if increased too far, will generate too much heat. Both of these factors must therefore be taken into consideration in order to determine the optimum moderator/fuel ratio in the seed region. Use of uranium/zirconium alloy for the seed fuel permits a higher moderator/fuel ratio because of its higher thermal conductivity compared to that of oxide fuel. Using these types of fuel elements, the moderator/fuel ratio in the seed region should be between 2.5 and 5.0, and preferably between 3.0 and 3.5. Another benefit of the use of the high moderator/fuel ratio in the seed is that it results in a substantial reduction in the generation of high level radioactive wastes, particularly transuranic actinides. This, combined with the fact that the blanket fuel rods remain in the core for approximately 10 years, results in a substantial reduction in long term waste storage space requirements.

The moderator/fuel volume ratio in the blanket region should be considerably lower than that in the seed region because it is desirable that the thorium fuel in the blanket absorb as many neutrons as possible. These are necessary to convert the thorium into fissionable U-233 which is burned in place, and supplies a substantial portion of the reactor power. Research has established that the optimum moderator/fuel volume ratio in the blanket region should be in the range of approximately 1.5–2.0, and preferably approximately 1.7. If the ratio is higher than 2.0, too many thermal neutrons will be absorbed by the water, while if the ratio is below 1.5, too much protactinium will be formed in the blanket region which will also interfere with the formation of U-233.

A once-through fuel cycle is employed with the first preferred embodiment which eliminates the need for reprocessing spent fuel assemblies for future use. In addition, a novel refueling scheme is employed which maximizes fuel consumption in both the seed and blanket regions, and further reduces the likelihood that any of the fuel remaining in the spent fuel elements can be reprocessed and employed in the manufacture of nuclear weapons. In this refueling scheme, the seed fuel elements are replaced in a staggered manner in which a portion, preferably ⅓, of the total seed fuel elements is replaced at the end of each fuel cycle, and each seed fuel element remains in the core for more than one, preferably three, fuel cycles. Each fuel cycle is approximately 13 months in length. The blanket fuel elements, because they are comprised predominantly of thorium, can remain in the core for up to nine fuel cycles, or approximately 10 years. However, shuffling of the SBUs in the core is performed at the end of each fuel cycle to improve power distribution throughout the core.

This refueling scheme enables the enriched uranium seed fuel rods to be depleted down to less than 20% of their original U-235 content. In addition, the long residency time in the core of the seed fuel elements increases the generation of Pu-238 to the point where it denatures the relatively small amount of Pu-239 which is generated by the seed fuel elements. As a result, the spent seed fuel elements are effectively rendered useless for the formation of nuclear weapons.

The second preferred embodiment of the present invention uses the same basic seed-blanket core arrangement as the first preferred embodiment with a plurality of SBUs that can be retrofitted into a conventional reactor core. However, this embodiment of the invention is designed specifically for consuming very large amounts of plutonium, either weapons grade or reactor discharge grade, with the thorium in the blanket. Thus, the thorium oxide is mixed with plutonium in the blanket fuel rods, while the seed fuel rods are formed predominantly of plutonium-zirconium alloy. Unlike the first embodiment whose goal is to maximize the amount of power generated by the thorium in the blanket, the goal of the second embodiment is to maximize the consumption of plutonium without generating large amounts of new plutonium as typically occurs in a conventional reactor.

The plutonium incinerator embodiment also employs a high water moderator/fuel volume ratio, preferably between approximately 2.5 and 3.5. However, the reason for the high ratio is different than that for the first embodiment. In particular, the high water to fuel volume ratio provides a very thermal spectrum in the seed regions. This simplifies core control since all control is concentrated in the seed regions, and control can thereby be effected without boron chemical control or increased use of control rods.

In the blanket region, the only notable difference in the plutonium incinerator embodiment is that the thorium oxide in the blanket fuel rods is mixed with a small percentage of plutonium oxide to assist during initial reactor operation. In addition, it is very important that approximately 2–5% by volume uranium tailings (natural uranium with its U-235 content reduced to approximately 0.2%) are added to the blanket fuel rods. These tailings serve to denature (render useless for use in the manufacture of nuclear weapons) the U-233 which is formed in the blanket during reactor operation. The moderator/fuel ratio in the blanket region is preferably between approximately 1.5 and 2.0 to satisfy neutronic and thermal hydraulic constraints.

BRIEF DESCRIPTION OF THE DRAWINGS

The features and advantages of the present invention will become apparent from the following detailed description of a number of preferred embodiments thereof, taken in conjunction with the accompanying drawings, in which:

FIGS. 5.1–5.9 are fuel loading maps corresponding to each of nine different seed fuel cycles that are employed during operation of the reactor core illustrated in FIG. 1;

BEST MODE FOR CARRYING OUT THE INVENTION

A. The Nonproliferative Light Water Thorium Nuclear Reactor

Figure 1:
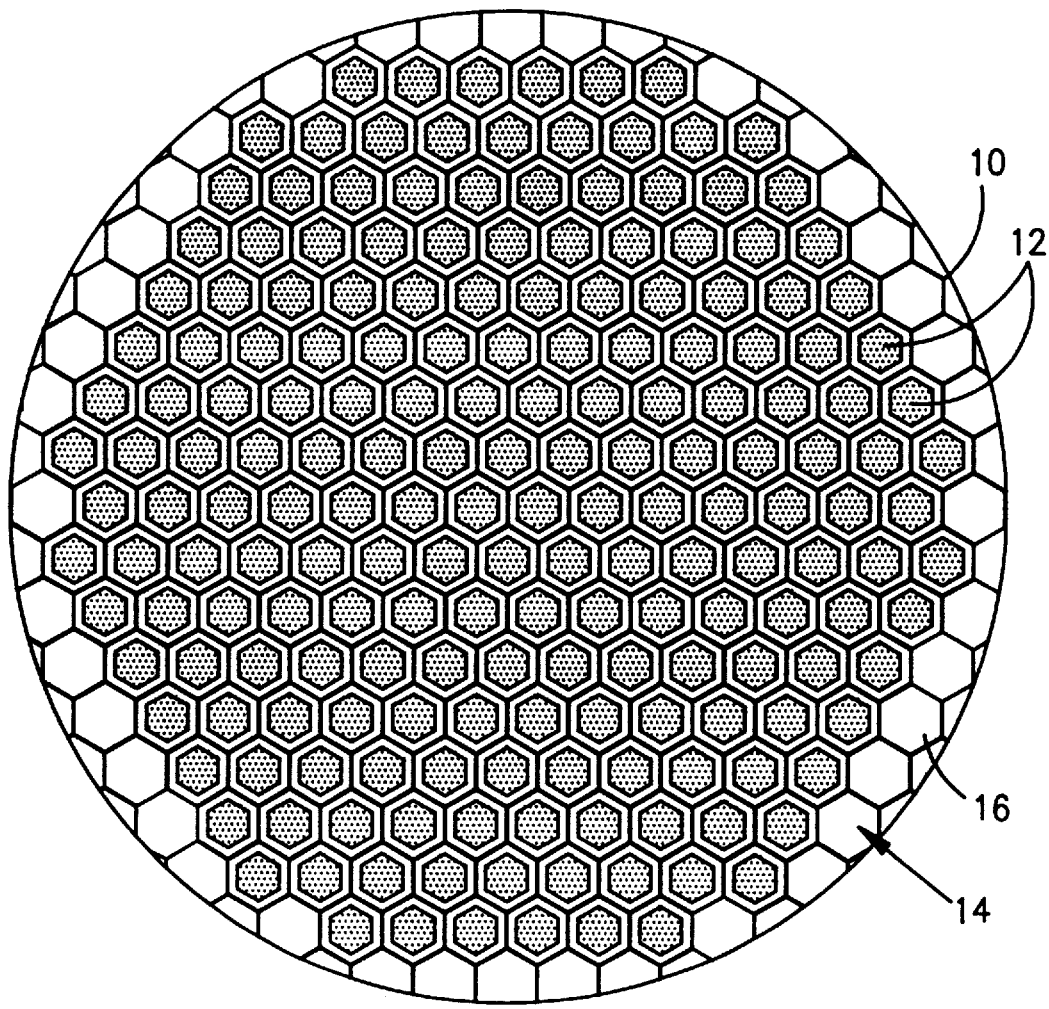
FIG. 1 is a schematic cross sectional illustration of a nuclear reactor core constructed in accordance with a first preferred embodiment of the present invention known as the nonproliferative light water thorium reactor.

Turning now to a detailed consideration of a first preferred embodiment of the present invention known as the nonproliferative light water thorium nuclear reactor, FIG. 1 illustrates a nuclear reactor core 10 comprised of a plurality of fuel assemblies 12, known as seed-blanket units (SBUs), that are arranged in a generally hexagonal configuration, and are themselves hexagonal in cross section. The core 10 is of the same geometrical configuration and dimensions as a conventional Russian light water reactor known as the VVER-1000 so that it can be easily retrofitted into a VVER-1000, and is formed of 163 of the SBU fuel assemblies 12. The difference between the core 10 and the VVER-1000 reactor core lies in the composition of the SBUs 12 as will be discussed in greater detail below. It will be understood that the shape and arrangement of the core 10 and the SBUs 12 can be modified as necessary to facilitate retrofitting into any type of conventional light water pressurized water reactor (PWR). For example, conventional PWRs in the United States and other countries employ fuel assemblies having square cross sections, and the SBUs 12 would also have square cross sections if they were designed to be retrofitted into such a PWR.

Surrounding the core 10 is a reflector 14 which is preferably comprised of a plurality of reflector assemblies 16 as illustrated in FIGS. 1 and 5.1–5.9. Each of the reflector assemblies 16 preferably contains a mixture of water and core barrel/pressure vessel metal. Alternatively, each of the reflector assemblies 16 could also be formed predominantly of thorium oxide.

Figure 2:
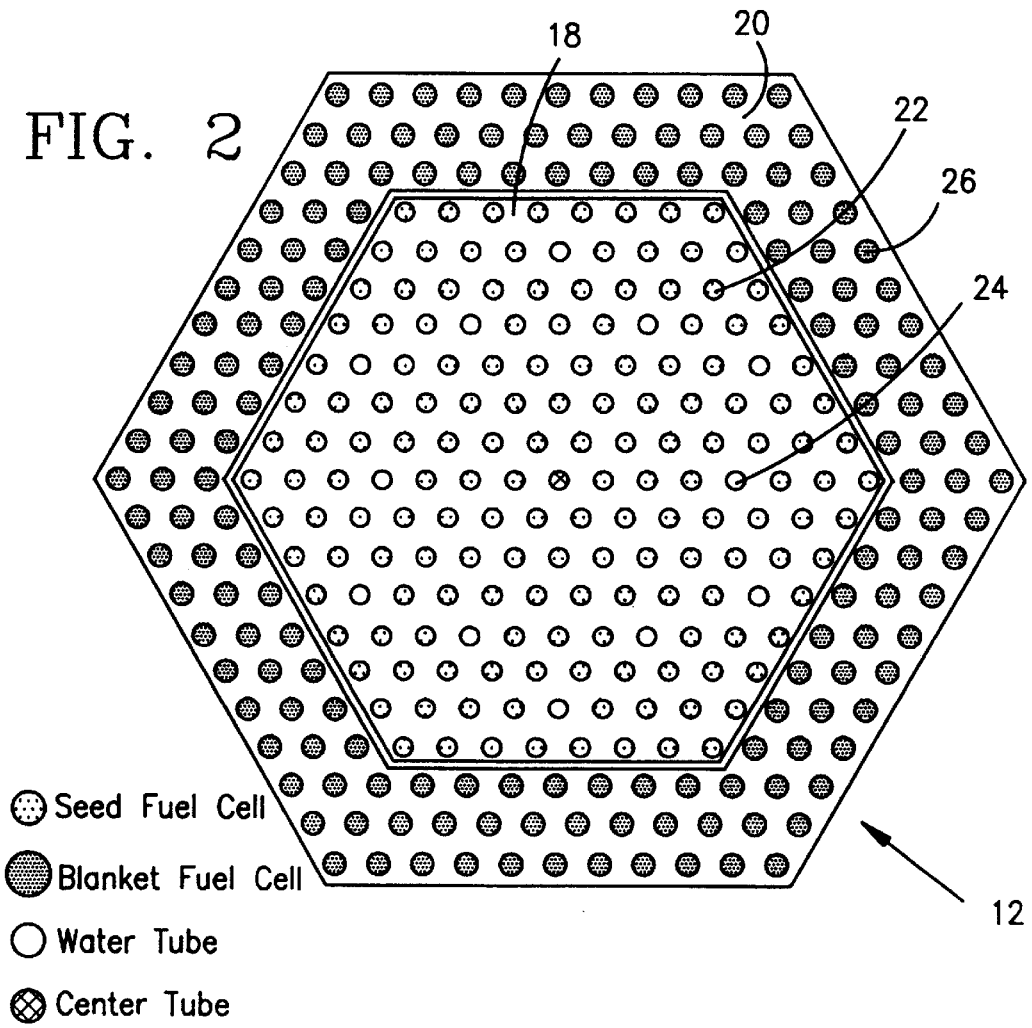
FIG. 2 is a detailed cross sectional illustration of a seed-blanket fuel assembly Unit (SBUs) employed in the first preferred embodiment.

FIG. 2 illustrates the composition of each of the SBU fuel assemblies 12. Each of the SBUs 12 includes a centrally located seed region 18 and an annular blanket region 20 which surrounds the seed region 18. The seed region 18 is comprised of a plurality of seed fuel rods 22 which are preferably formed of uranium-zirconium alloy containing U-235/U-238 initially enriched to as high as 20% U-235, which is the maximum enrichment that is considered to be nonproliferative, i.e., incapable of being utilized to manufacture nuclear weapons. While it is not necessary to maximize the initial U-235 enrichment to 20%, it is preferable to employ this enrichment level to minimize plutonium production in the seed during reactor operation. Alternatively, the fuel rods 22 can be made of cermet fuel with uranium oxide particles embedded in a zirconium alloy matrix. The use of zirconium alloy (zircalloy) in the seed fuel rods 22 is preferred over oxide type fuel because the zirconium alloy fuel has a much higher thermal conductivity. As will be discussed in greater detail below, this is important because it reduces the amount of space needed in the SBU 12 for heat removal, and thereby increases the amount of space available for water moderator. The seed region 18 also contains a plurality of water tubes 24 for reception of water moderator (or conventional burnable poison rods and/or control rods as discussed in greater detail below) to control reactivity in the seed region 18.

The blanket region 20 contains a plurality of blanket fuel rods 26 which are preferably formed of mixed thorium-uranium oxide. The initial uranium oxide volume content in the thorium-uranium mixture is preferably in the range of approximately 2–10%, and is employed to help fuel the blanket region 20 on start up before the thorium has had a chance to absorb neutrons from the seed, and generate the blanket's own fissile fuel, U-233. As in the seed fuel rods 22, the uranium oxide contained in the blanket fuel rods 24 is preferably U-235/U-238 enriched initially as high as the maximum nonproliferative ratio of 20:80.

The seed-blanket core 10 operates in accordance with the following simplified equation for the power sharing between the seed 18 and the blanket 20:

$$P_b/P_s = \epsilon(K_b/(1-K_b))((K_{s-1})/K_s$$

In the foregoing equation, $K_s$ and $K_b$ are the multiplication factors of the seed and blanket respectively. $P_s$ and $P_b$ are the powers generated in the seed and blanket respectively, while $\epsilon$ is the fast effect, which is slightly over 1. The seed multiplication factor, $K_s$, is greater than 1, and the blanket multiplication factor, $K_b$, is less than 1. Thus, the blanket is subcritical, and the seed acts as a source of neutrons for the blanket.

In order to maximize the amount of energy produced from thorium, it is necessary to make the fraction of the core power produced in the blanket 20 as high as possible. This is accomplished by making $K_s$ as high as possible, and it has been determined that $K_s$ can be as high as 1.70, while $K_b$ is selected between approximately 0.85 and 1.

The number of neutrons absorbed by U-238 in the seed 18 must be minimized. Most of the neutrons absorbed in U-238 are in what is called the resonance energy region marked by closely spaced energy intervals of extremely high absorption. On the other hand, most of the fissions in U-235 occur at lower energies in the thermal region where the average neutron energy is in near equilibrium with the ambient temperature of the light water moderator. By making the water content of the seed 18 as high as practicable, the number of neutrons in the resonance region is decreased, and thus, fewer neutrons are captured by the U-238.

Reduction of U-238 captures produces two favorable effects. First, the multiplication factor of the seed, $K_s$, is raised, thereby increasing the fraction of core power produced in the blanket as discussed above, and second, the formation of plutonium is minimized since it is the U-238 neutron captures which forms the plutonium.

The amount of water that can be placed in the seed region 18 is limited by the need to have enough room for the fuel rods 22 to permit adequate heat removal from the same. The volume and surface area of the fuel rods must therefore not be reduced to the point where the power density in the core rises beyond operational limits dictated by the reactor's cooling system. By fabricating the seed fuel elements 22 out of uranium/zirconium alloy, which has a much higher thermal conductivity than does oxide fuel, the water moderator/fuel volume ratio in the seed 18 can be made as high as 4 or 5 to 1 as compared with less than 2 to 1 in a conventional uranium core. The water moderator/fuel ratio in the seed 18 should therefore be selected between approximately 2.5 and 5.0, and most preferably between 3.0 and 3.5.

Another advantage to the high moderator/fuel volume ratio in the seed 18 is that it substantially reduces the quantity of high level radioactive waste generated in the seed 18. In particular, because the seed spectrum is very thermal due to the large water fraction, very few transuranic or minor actinides will be produced. It is these actinides, with half lives of millions of years, that require very long term storage in underground repositories. The 10 year blanket life coupled with the reduced actinide production from the nonproliferative core 10 therefore produces less radioactive waste materials and also less long term heat generation. This results in underground repository space requirements being significantly reduced. In addition, low level waste is also somewhat reduced because no boric acid is dissolved in the water moderator for normal operation, and thus no tritium is generated in the core. It should be noted that the reason boric acid is not employed in the water moderator is that it would unacceptably lower the multiplication factor in the blanket region 20.

The moderator/fuel ratio in the blanket region 20 is also a very important parameter, however, it is governed by different constraints. In particular, the situation in the blanket 20 is more complex because too much water reduces $K_b$ by absorbing too many neutrons coming from the seed fuel elements, and thereby taking them away from the thorium. On the other hand, too little water in the blanket increases the loss to protactinium. When thorium absorbs a neutron, it forms protactinium, which after a 27.4 day half-life, decays into fissionable U-233. During this interval, protactinium is vulnerable to absorbing a neutron and thereby forming nonfissionable U-234. This is a double loss of both a neutron and a prospective U-233 nucleus. Research indicates that to minimize this loss, the optimum value of the water/fuel ratio in the blanket 20 should be selected between approximately 1.5 and 2.0, and preferably approximately 1.7.

Preferably, the seed region 18 comprises between approximately 25 and 40 percent of the total volume in the SBU 12. This range of values is also determined based upon competing considerations. First, the core 10 is designed to burn as much thorium as possible, thus the blanket region 20 must be made as large as practical. On the other hand, the seed region 18 cannot be made so small that the power density therein rises too high for the reasons given previously. The range of 25–40 percent has been determined to provide the optimum balance of these competing in considerations.

Still another important design aspect of the SBU 12 is the central seed/annular blanket configuration. In Applicant's previously published International Application, Publication No. WO85/01826, a seed-blanket core is disclosed which employs an annular seed with both an inner, central blanket section and an outer, surrounding blanket section. Such an arrangement cannot be made nonproliferative because the thin, annular seed has a correspondingly small "optical thickness" which causes the seed spectrum to be dominated by the much harder spectrum of the inner and outer blanket sections. This results in higher thermal neutron energies, and a resulting increased production of Pu-239 in the seed. The central seed arrangement of the SBU 12 overcomes this drawback by making the seed section 18 thick enough to avoid excessive interaction with thermal neutrons crossing from the blanket section 20 into the seed section 18.

The referenced core and fuel assembly parameters for the core 10 and each of the SBUs 12 are presented in Tables 1 and 2, respectively, below. These parameters were selected to provide a complete compatibility of the SBU fuel assembly with an existing (typical) VVER-1000 plant.

TABLE 1

Core Parameters

| Parameter | |
|---|---|
| Total Power (MWth) | 3000 |
| Average Power Density (w/cm$^3$) | 107 |
| Average Moderator Temp., °C. | 306 |
| Number of SBUs in Core | 163 |
| Number of Control Rod Clusters (CRC) | 61 |
| Number of Control Rods per CRC | 12 |
| Blanket Fuel | U + Th(O$_2$) |
| Seed Fuel | U/Zr Alloy |
| Seed Reload Schedule | 54 Seed/Cycle (≈1 Year) |
| Blanket Reload Schedule | 163 Blankets/9 Cycles (≈10 Years) |

TABLE 2

SBU Parameters

| Parameter | Seed | Blanket |
|---|---|---|
| Outer Radius of Fuel Pellet, cm | 0.310 | 0.380 |
| Outer Radius of Gas Gap, cm | — | 0.3865 |
| Outer Radius of Cladding, cm | 0.370 | 0.4585 |
| Cell Radius, cm | 0.6652 | 0.6731 |
| Pitch, cm | 1.267 | 1.282 |
| Moderator/Fuel Volume Ratio | 3.18 | 1.68 |
| Number of Fuel Rods | 156 | 162 |
| Number of Water Tubes | 12 | 0 |
| Number of Other Tubes | 1 | 0 |
| Seed Total Weight, tH.M. | 6.71 | — |
| Blanket Total Weight, tH.M. | — | 35.82 |
| U (In Blanket) t | — | 3.11 |

Figure 3:
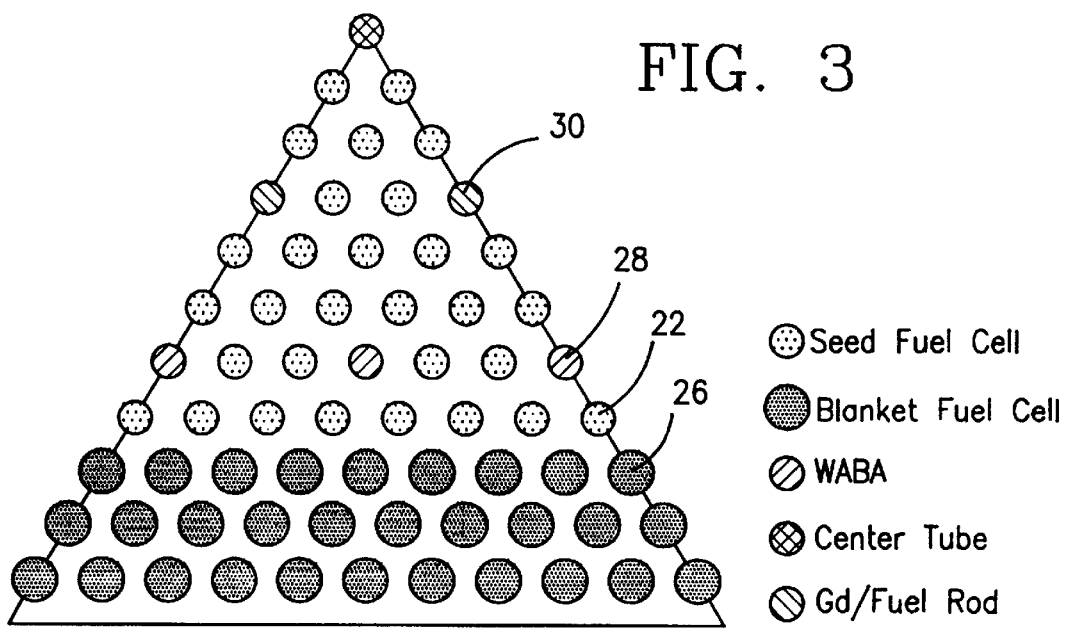
FIG. 3 is a partial cross sectional illustration of an SBU modified to include burnable poison rods for reactor control.

To provide additional reactivity control during each seed cycle, the SBU 12 can be modified as illustrated in FIG. 3 to include a plurality of burnable poison containing rods 28 and 30 which are positioned at spaced locations in the seed section 18. In the example illustrated in FIG. 3, the first group of burnable poison rods 28 comprise standard Westinghouse burnable poison rods known as WABAs as are presently utilized in conventional PWR fuel systems. These rods are formed of a composite material consisting of boron-10, boron-11, carbon, aluminum and oxygen. The second group of burnable poison containing rods 30 comprise uranium/zircalloy seed fuel rods which have been modified to contain a small percentage of natural gadolinium. Any number and combination of the burnable poison containing rods 28 and 30 can be employed as necessary. In the example illustrated in FIG. 3, each SBU 12 contains 12 of the WABAs 28 and 6 of the gadolinium/fuel rods 30.

Figure 4:
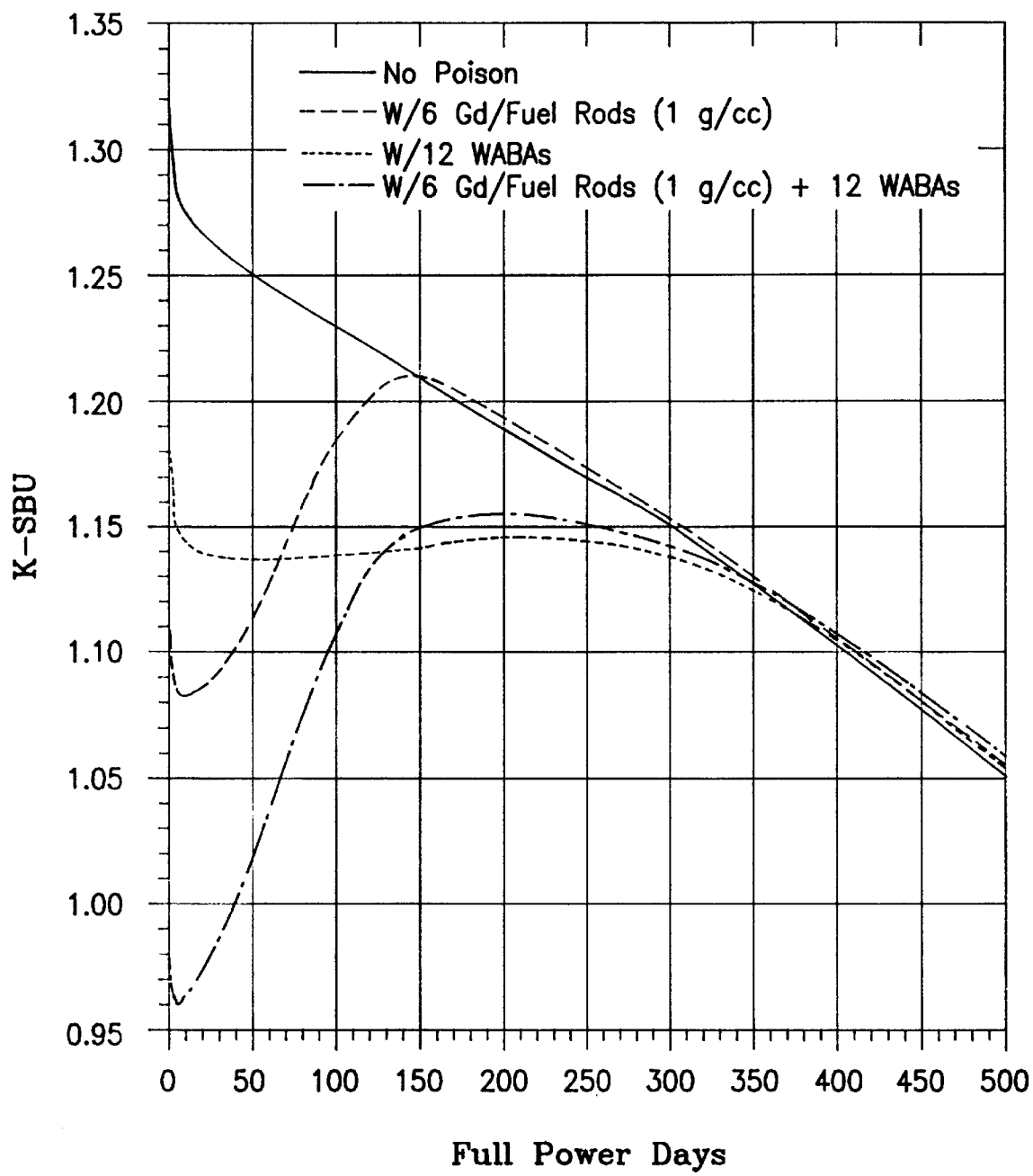
FIG. 4 is a graph illustrating the reactivity level as a function of full powered days for the first seed fuel cycle of a number of variations of the modified SBU illustrated in FIG. 3.

Both types of burnable poison rods have their advantages. The WABAs provide a more uniform control of reactivity until the end of each reactor fuel cycle, while the gadolinium/fuel rods 30 provide a large negative reactivity input for the first third of the reactor cycle life. FIG. 4 illustrates the reactivity level K in each of the SBUs 12 as a function of full power days for each of four seed control variations: no poison, gadolinium poison, boron poison and combined gadolinium and boron poison. As illustrated, the combination of both types of poison control results in the flattest reactivity curve.

Conventional control rods are also preferably employed to compensate the excess reactivity in the reactor core. In addition, the control rods can be employed for emergency shutdown (scram) of the reactor and compensation for power transients resulting from Xe oscillations and moderator temperature transients. The control rods are assembled into control rods clusters (CRCs) with 12 control rods per CRC. As noted in Table 1, it is not necessary that each of the SBUs 12 include a CRC, and calculations indicate that it is sufficient to place place one CRC in each of 61 of the 163 SBUs in the core.

In the operation of the nonproliferative light water thorium nuclear reactor core 10, a once-through fuel cycle is employed in which all of the fuel rods in both the seed and blanket regions 18 and 20 are used in the reactor core only once. However, a unique fuel management scheme is employed in which the seed and blanket fuel assemblies follow separate fuel management paths. In particular, each of the seed fuel rods 22 remains in the reactor core for more than one seed fuel cycle (approximately 13 months), preferably three cycles, however, only a fraction (preferably ⅓) of the seeds is replaced at the end of each seed fuel cycle. Preferably, the positions of the SBUs 12 in the core 10 are also shuffled at the end of each seed fuel cycle to improve the power distribution throughout the core. In contrast, each of the blanket fuel rods 24 remains in each SBU 12 for the entire life of the blanket 20, which is preferably 9 fuel cycles, or approximately 10 years.

This fuel management scheme combined with the seed-blanket arrangement and associated core parameters allows approximately 80–90% of the uranium in the seed fuel elements 22 to be consumed before they are removed from the core 10. As a result, the spent seed fuel rods 22 are of no economic or nuclear value since so little of the original U-235 loading remains.

In addition, this extended burn-up of the seed fuel rods causes a buildup of Pu-238 which is sufficiently high to completely denature the small amount (approximately 30 kg. per year) of Pu-239 that is produced in the seed 18. More specifically, approximately 8–9% of the total plutonium produced by the reactor core 10 is Pu-238. Since Pu-238 is a heat generator which produces approximately 300 times the amount of heat generated by Pu-239, weapons grade plutonium, such a high percentage of Pu-238 prevents the plutonium produced by the reactor core from being used for weapons purposes. In particular, numerous studies have determined that reactor grade plutonium cannot be used for weapons purposes, even by refrigerating the weapons down to 0° F., where the content of Pu-238 equals or exceeds 4.9% by weight. At these concentrations, the heat generated by the Pu-238 causes the high explosives to melt and the plutonium to eventually melt also, or at least change phase from its normal Alpha Phase to Delta Phase. The phase change decreases its density and substantially increases its critical mass. Since the nonproliferative core 10 produces concentrations of Pu-238 well in excess of 4.9%, this effectively renders the discharged plutonium essentially nonproliferative.

The multiple batch fuel management scheme is illustrated in greater detail in FIGS. 5.1 through 5.9 which show a pie slice section of approximately one-fifth of the SBUs 12 in the core 10. Each of the FIGS. 5.1–5.9 shows the fuel loading map for each of the nine seed fuel cycles which correspond to one blanket fuel cycle. The fuel loading maps reflect the basic approach adopted, i.e., a three batch fuel management scheme. This means that at all cycles, with the exception of the transient cycles one and two, there are three seed batches: fresh, once-burned and twice-burned. These are designated on the reload maps as F, O and T, respectively. Another major factor influencing the reload pattern is the heavy use of burnable poisons which are capable of suppressing local power peaks. It should also be noted that the majority of the fresh fuel is not loaded at the core periphery, but is distributed predominantly within the middle part of the core at positions 6, 8, 10 and 12, and near peripheral positions 20, 21, 23, 26 and 32. Additional information shown in FIGS. 5.1–5.9 shows the distribution of the U-Gd and WABA poison rods within the core. The elaborate burnable poison distribution reflects the complexity of the reload patterns and the low leakage configurations used in this design. Those SBUs having CRCs are also indicated by a C.

At the beginning of core life, i.e., cycle one, all fresh seed fuel assemblies are loaded. In order to achieve a reasonable radial power distribution, three different uranium enrichments and weight fractions are used. As indicated in FIG. 5.1, a first third of the SBUs 12 contains seed fuel rods having 9.5% by volume uranium enriched to 12% by weight U-235, a second third of the SBUs 12 contain seed fuel rods having 14.5% by volume uranium enriched to 17% by weight U-235, and the remaining third of the SBUs 12 contain seed fuel rods having 17% by volume uranium enriched to 20% by weight U-235. The target fresh fuel enrichment of 20% by weight of U-235 was used thereafter for each of the following cycles 3–9. Thus, cycles one and two are transient cycles, while cycles 3–9 are quasi-equilibrium cycles. The fresh fuel enrichment was constant at 20% U-235 by weight, but the weight fraction of uranium in the U/Zr alloy was varied to assure 300 full power days of operation which correspond to one seed fuel cycle. Since the reactor is not usually operated at full power during the entire fuel cycle, it is estimated that the actual length of the seed fuel cycle is approximately 13 months.

B. The Plutonium Incinerator

The second preferred embodiment of the present invention is another seed-blanket reactor core design known as the plutonium incinerator. As the name implies, the goal of this embodiment of the invention is to consume as much weapons or reactor grade plutonium as possible. This is in contrast to the goal of the first preferred embodiment of the invention which is to derive as much energy as possible from the thorium fuel in the blanket. As will be discussed in greater detail below, the completely different goal of the plutonium incinerator dictates that completely different core parameters be employed.

Figure 6:
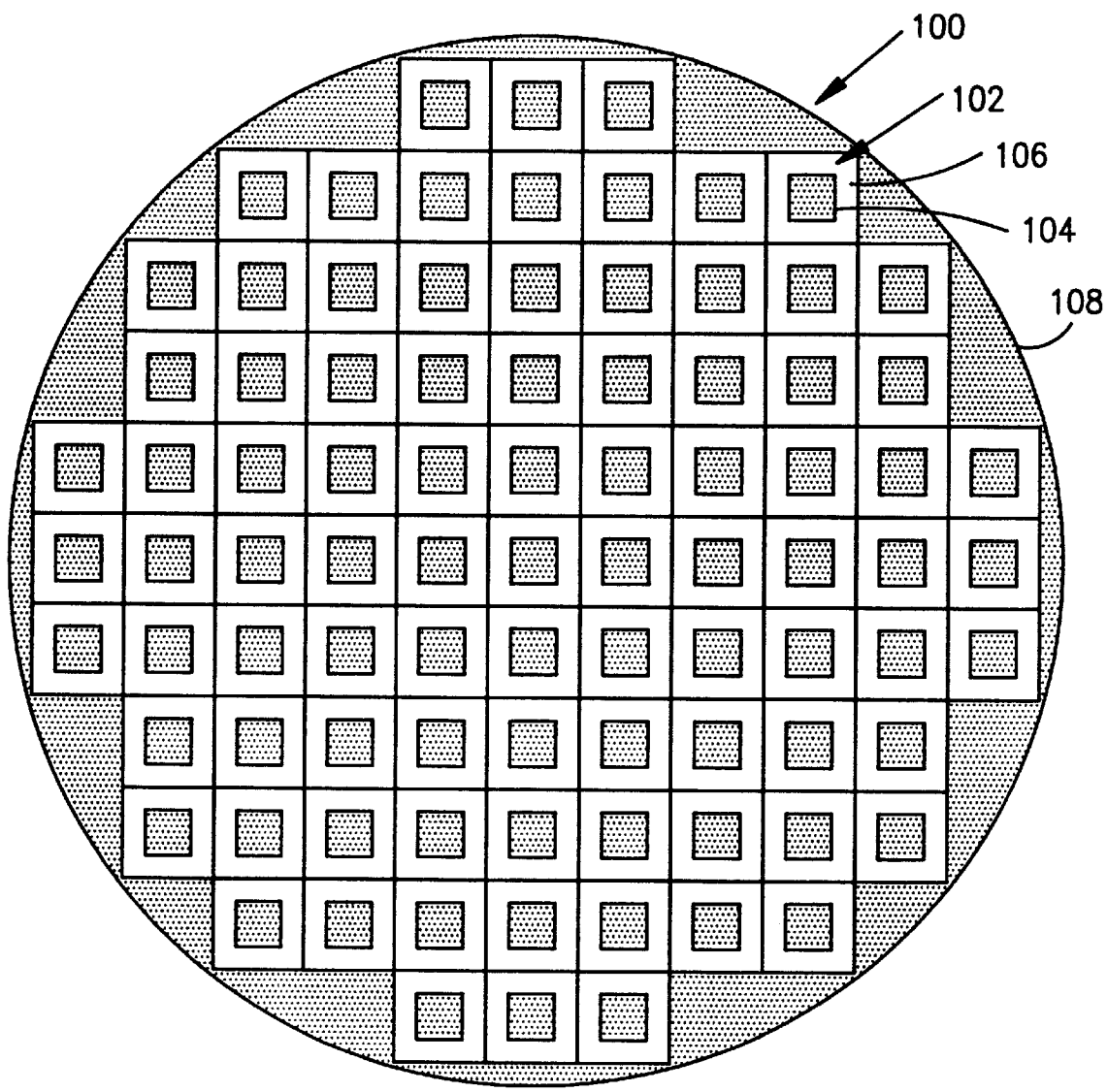
FIG. 6 is a schematic cross sectional illustration of a reactor core constructed in accordance with a second preferred embodiment of the invention known as the plutonium incinerator.

The preferred form of the plutonium incinerator embodiment is illustrated in FIG. 6, and comprises a reactor core 100, again formed from a plurality of SBUs 102. The core 100 has a generally circular cross section, and 89 of the SBUs 102, each of which has a square cross section. It should be noted once again that the size and shape of the reactor core is arbitrary, and can be varied as necessary to achieve a desired power output, and/or accommodate retrofitting into any type of conventional core.

Each of the SBUs 102 includes a central seed region 104 and an annular blanket region 106. The total percentage of the SBU volume occupied by the seed region 104 is chosen in this embodiment to be as large as possible, preferably between approximately 45 and 55%, so that as much plutonium can be burned in the seed as possible. A reflector 108 made of any suitable material, such as thorium oxide, surrounds the core 102.

Figure 7:
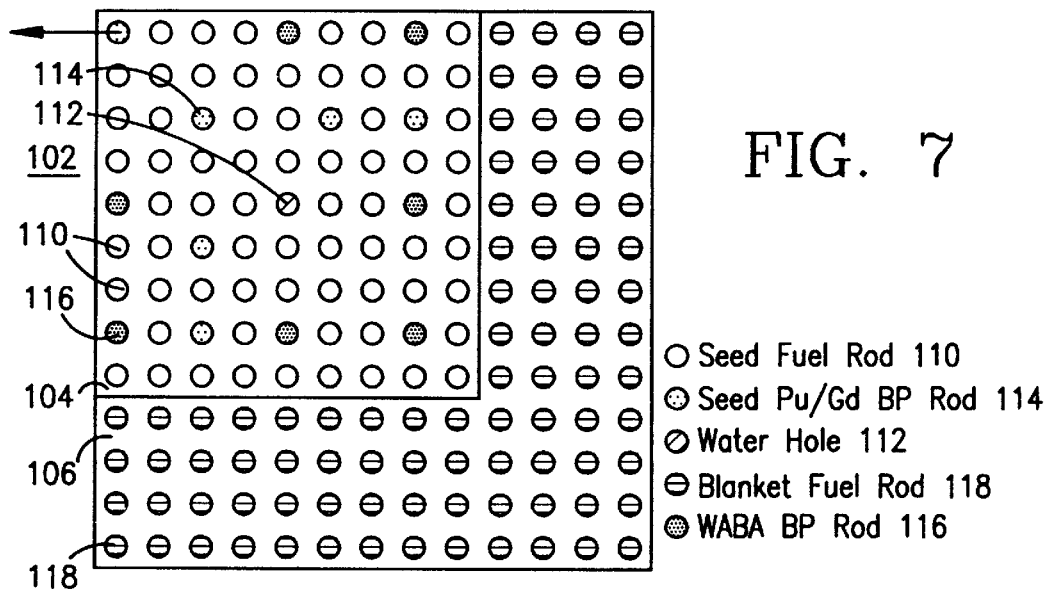
FIG. 7 is a detailed cross sectional illustration of an SBU employed in the second preferred embodiment.

One preferred form of the SBU 102 is illustrated in FIG. 7. As illustrated, the seed region 104 is comprised of a first plurality of seed fuel rods 110 formed of plutonium (weapons or reactor grade) and zirconium alloy, or alternatively, cermet fuel. A plurality of water holes 112 are uniformly spaced throughout the seed region 104 for reception of control rod pins. First and second pluralities of burnable poison containing rods 114 and 116 are also uniformly positioned throughout the seed region 104. The burnable poison containing rods 114 are preferably formed of a mixture of the seed fuel and gadolinium. These can be of two types, the first type having a gadolinium concentration of 0.36 g/cc, and the second type having a gadolinium concentration of 0.72 g/cc. The burnable poison containing rods 116 preferably comprise conventional WABA poison rods. Any combination of the two types of burnable poison containing rods 114 and 116 can be employed as desired.

The blanket region 106 contains a plurality of blanket fuel rods 118 formed predominantly of thorium oxide. Preferably, a small percentage, less than approximately 1% by volume, of plutonium oxide is mixed with the thorium oxide in the blanket fuel rods 116 to keep the blanket multiplication factor high during initial reactor operation. In addition, it is very important that approximately 2–5% by volume uranium tailings (natural uranium with most of its U-235 isotope removed) are added to the thorium to denature the U-233 which is formed in the thorium during reactor operation by nonfissile isotopes, U-236 and U-238. This is necessary because, unlike in the first preferred embodiment in which a small amount of enriched uranium is added to the blanket fuel rods which itself can generate these nonfissile isotopes, the plutonium added to the blanket fuel rods in the plutonium incinerator embodiment is incapable of generating these nonfissile isotopes.

The moderator/fuel volume ratio in the seed region 104 is selected to be much higher than in a conventional reactor core, however, the reasons for doing so are different than in the nonproliferative embodiment of the present invention. In particular, the moderator/fuel ratio is selected to be between approximately 2.5 and 3.5, and preferably between 2.5 and 3.0. This effect further increases the control poison reactivity worth therein, thereby making the reactor much easier to control. As in the nonproliferative core embodiment, the moderator/fuel ratio in the blanket region is selected to be between approximately 1.5 and 2.0.

Example values for the main core and SBU parameters for the plutonium incinerator embodiment of the present invention are provided in Tables 3 and 4 below:

TABLE 3

Main Core Parameters

| Parameter | Value |
|---|---|
| Power Level, MWth | 3250 |
| Number of SBUs in Core | 89 |
| Equivalent Diameter of Core, cm | 380 |
| Active Height of Core, cm | 365 |
| Average Power Density, w/cc | 78.5 |

TABLE 4

Additional Core Parameters

| Parameter | Seed | Blanket |
|---|---|---|
| Number of Fuel Rods/SBU | 264 | 384 |
| Number of Water Holes/SBU | 25 | 0 |
| Distance Across Flats, cm | 25.5 | 35.7 |
| % of SBU Volume | 51 | 49 |
| Fuel Pin Diameter, mm | 8.7 | 8.7 |
| Fuel Rod Diameter, min | 9.7 | 9.7 |
| Pitch, mm | 15.0 | 12.75 |
| Moderator/Fuel Volume Ratio | 2.54 | 1.49 |
| Fuel Type | Metallic | Oxide Composite |
| Fuel Material | 2.4 Vol % Pu 97.6 Vol % Zirc-alloy | 0.55 Vol % $PuO_2$ 94.45–97.45 Vol % $ThO_2$ 2.0–5.0 Vol % U tailings |
| Core Heavy Metal Loading, kg | 2300 Pu | 60,700 Th 392 Pu 100 U tailings |

In the operation of the plutonium incinerator core 100, the seed fuel rods 110 and the blanket fuel rods 118 reside in the core for two years, and are discharged simultaneously. This fuel reload scheme is optimal from the point of view of the plutonium inventory reduction rate, but probably is suboptimal from the thorium utilization point of view. However, this is not a concern since the goal of the plutonium incinerator core 100 is to maximize consumption of plutonium.

Figure 8:
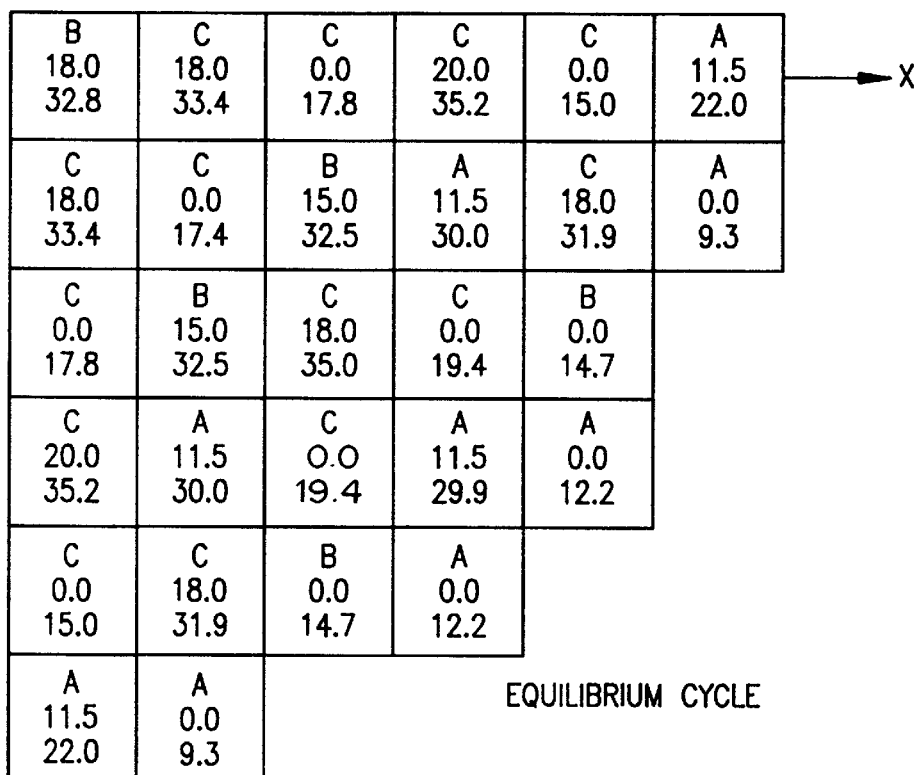
FIG. 8 is a core map illustrating the reload configuration and accumulated burnup for the second preferred embodiment.

Preferably, the fuel management scheme adopts a two-batch core with a standard out-in pattern. The reload configuration and accumulated burnup for the once and twice burnt fuel assemblies are illustrated in the core map of FIG. 8. The accumulated burnup for the once burnt assemblies is approximately 15 GWD/T and the discharge fuel averages approximately 31 GWD/T. Three different types of fuel assemblies are illustrated in the core map of FIG. 8. Type A assemblies employ 20 of the gadolinium based burnable poison rods 14, each having a gadolinium concentration of 0.36 g/cc, type B fuel assemblies also contain 20 of the gadolinium based burnable poison rods 114, however, these have a gadolinium concentration of 0.72 g/cc, and type C fuel assemblies contain 20 of the gadolinium based burnable poison rods 114 with a gadolinium concentration of 0.72 g/cc, as well as 20 of the WABA burnable poison rods 116.

The annual charge of Pu-239 in the plutonium incinerator core 100 is approximately 1350 kg. Each year, 500 kg of plutonium are discharged from the reactor thus leaving a net destruction rate of approximately 850 kg of total plutonium, although only approximately 200 kg of Pu-239 remains since the rest of the remaining plutonium is in the form of the other plutonium isotopes, Pu-240, 241 and 242. An equilibrium cycle based on a standard sized LWR fuel assembly utilizing the seed-blanket concept will give the equivalent results.

The advantages of using the thorium fuel cycle for incinerating Pu-239 in a seed-blanket reactor result from the neutronic properties of thorium, namely its high thermal absorption crosssection. This leads to a high initial Pu inventory, and therefore to high consumption of Pu per unit energy. Driving the thorium blanket with Pu fissile material causes a high Pu power share and therefore efficient Pu incineration.

Use of a conventional homogenous light water reactor (LWR) core design presents a controllability problem. Excess reactivity of a fuel cycle based on Pu is of the same value of a similar uranium based cycle, while reactivity worth of a standard control mechanism is significantly lower. The Pu-based fuel is characterized by a very high thermal absorption cross-section, which is competing with control poison material for thermal neutrons. The results of a conventional homogeneous assembly design indicate that the effectiveness of control rods, soluble boron and burnable poisons is reduced by approximately a factor of 2 as compared with conventional LWR values. The obvious solutions to this problem are to improve the reactivity control worth of different control mechanisms, such as utilization of more potent absorbers and/or increasing moderator/fuel volume ratio of the core. Unfortunately, such solutions have a negative impact on safety and economic performance parameters of the reactor.

The thorium based seed-blanket design provides a unique solution to this problem which does not carry economic or operational penalties. Since the control rods and/or burnable poison rods are only positioned in the seed region 104 of each SBU 102, the control effectiveness of these is substantially increased because the power density of the seed portion is much higher than that of the core average. Thus, the neutron importance function in the seed is very high, thereby increasing the reactivity worth of the control and poison rods. In addition, the high moderator/fuel volume ratio in the seed region improves power distribution within the SBU, thereby further increasing the control poison reactivity worth.

C. Summary

In summary, the present invention provides two novel thorium based seed-blanket reactor core arrangements which are particularly significant in that they provide economical, viable solutions to the problems of nuclear proliferation and weapons grade nuclear fuel destruction, while at the same time providing an economic reliable source of electrical power. The nonproliferative embodiment of the present invention is ideal for use by lesser developed countries because it eliminates any concern that the reactor fuel or waste materials will be used for making nuclear weapons, since neither of them can be used for this purpose. The plutonium incinerator embodiment is particularly attractive for use in providing an excellent means by which stockpiled weapons and reactor grade plutonium can be conveniently destroyed. In both embodiments, the seed-blanket core arrangement is necessary to provide the desired results. Without it, the nonproliferative embodiment would not work, i. e., would generate proliferative waste materials. In the plutonium incinerator, the seed-blanket arrangement is needed to insure proper reactor control, and prevent generation of significant new amounts of Pu-239.

Although the invention has been disclosed in terms of a number of preferred embodiments, it will be understood that numerous other variations and modifications could be made thereto without departing from the scope of the invention as defined in the following claims.

I claim:

1. A method for operating a nuclear reactor core comprised of at least first and second groups of seed-blanket units, each said seed-blanket unit in each of said groups including a central seed region and an annular blanket region, said method comprising the steps of:
    a) charging the seed regions of said first group of said seed-blanket units with a plurality of seed fuel elements containing uranium enriched to a first level;
    b) charging the seed regions of said second group of said seed-blanket units with a plurality of seed fuel elements containing uranium enriched to a second, higher level;

c) charging said blanket regions in both said first and second groups of said seed-blanket units each with a plurality of blanket fuel elements containing predominantly thorium oxide mixed with approximately 10% or less by volume uranium oxide;

d) providing moderator in said seed regions of each of said seed-blanket units in both of said first and second groups in the volume ratio of moderator/fuel in the range of approximately 2.5–5.0;

e) providing moderator in said blanket region of each of said seed-blanket units in both of said first and second groups in the volume ratio of moderator/fuel in the range of approximately 1.5–2.0;

f) replacing the seed fuel elements in said first group of seed-blanket units at the end of a first seed fuel cycle with a first group of fresh seed fuel elements;

g) replacing the seed fuel elements in said second group of seed-blanket units at the end of a second seed fuel cycle with a second group of fresh seed fuel elements; and h) replacing said blanket fuel elements in each of said seed-blanket units in said first and second groups at the end of a blanket fuel cycle, said blanket fuel cycle having a time interval length which is independent of a time interval length of said seed fuel cycles.

2. The method of claim 1, wherein the time interval length of said seed fuel cycles is selected so that each group of seed fuel elements remains in said core until their uranium loading is depleted to approximately 20% or less of their initial uranium loading.

3. The method of claim 1, further comprising:

charging the seed regions of a third group of said seed-blanket units in said core each with seed fuel elements containing uranium enriched to a third level which is higher than both said first and second levels;

charging the blanket regions in said third group of said seed-blanket units each with a plurality of blanket fuel elements containing predominantly thorium oxide mixed with approximately 10% or less by volume uranium oxide; and replacing said seed fuel elements in said third group of seed-blanket units at the end of a third seed fuel cycle with a third group of fresh seed fuel elements.

4. The method of claim 3, wherein said step of replacing said blanket fuel elements further comprises replacing said blanket fuel elements in each of said seed-blanket units at the end of 9 seed fuel cycles.

5. The method of claim 1, wherein said reactor core is selected to be a conventional pressurized water reactor core, and each of said seed-blanket units is selected to have a cross sectional size and shape which is the same as a conventional uranium fuel assembly employed in a conventional pressurized water reactor.

6. The method of claim 5, wherein each of said seed-blanket units is selected to have a hexagonal cross sectional shape.

7. The method of claim 5, wherein each of said seed-blanket units is selected to have a square cross sectional shape.

8. The method of claim 1, wherein each of said seed fuel elements in both of said groups is formed of fissionable material comprising U-235 and U-238 in the ratio of approximately 20% or less U-235 to 80% or more U-238.

9. The method of claim 1, wherein the seed regions in each of said seed-blanket units are selected to comprise between approximately 25 and 40% of the total volume of each of said seed-blanket units.

10. The method of claim 1, further comprising the step of reshuffling the seed-blanket units in said nuclear reactor core after each seed fuel cycle to adjust the power distribution throughout said core.

11. The method of claim 3, further comprising the steps of replacing the seed fuel elements in said first group of seed-blanket units at the end of a fourth and a seventh seed fuel cycle with fresh seed fuel elements containing uranium enriched to said third level, replacing the seed fuel elements in said second group of seed-blanket units at the end of a fifth and an eighth seed fuel cycle with fresh seed fuel elements containing uranium enriched to said third level, and replacing the seed fuel elements in said third group of said seed-blanket units at the end of a sixth and ninth seed fuel cycle with fresh seed fuel elements containing uranium enriched to said third level.

12. The method of claim 11, wherein said step of replacing said blanket fuel elements further comprises replacing said blanket fuel elements in each of said seed-blanket units in said first, second and third groups at the end of the ninth seed fuel cycle.

13. The method of claim 3, wherein said third uranium enrichment level is selected to be approximately 20% or less U-235 to 80% or more U-238.

14. The method of claim 13, wherein said first and second uranium enrichment levels are selected to be approximately 12% U-235 to 88% U-238, and approximately 17% U-235 to 83% U-238, respectively.

15. The method of claim 1, wherein said step of providing moderator in said seed regions further comprises providing moderator in said seed regions in the volume ratio of moderator/fuel in the range of approximately 3.0–3.5.

16. A method for operating a nuclear reactor core comprised of at least first, second and third groups of seed-blanket units, each said seed-blanket unit in each of said groups including a central seed region comprising between approximately 25 and 40% of the total volume of each of said seed-blanket units, and an annular blanket region, said method comprising the steps of:

a) charging the seed regions of said first group of said seed-blanket units with a plurality of seed fuel elements containing uranium enriched to a first-level;

b) charging the seed regions of said second group of said seed-blanket units with a plurality of seed fuel elements containing uranium enriched to a second, higher level;

c) charging the seed regions of said third group of said seed-blanket units with a plurality of seed fuel elements containing uranium enriched to a third, still higher level;

d) charging said blanket regions in said first, second and third groups of said seed-blanket units each with a plurality of blanket fuel elements containing predominantly thorium oxide mixed with approximately 10% or less by volume uranium oxide;

e) providing moderator in said seed regions of each of said seed-blanket units in both of said first and second groups in the volume ratio of moderator/fuel in the range of approximately 2.5–5.0;

f) providing moderator in said blanket region of each of said seed-blanket units in both of said first and second groups in the volume ratio of moderator/fuel in the range of approximately 1.5–2.0;

g) replacing the seed fuel elements in said first group of seed-blanket units at the end of a first seed fuel cycle with a first group of fresh seed fuel elements;

h) replacing the seed fuel elements in said second group of seed-blanket units at the end of a second seed fuel cycle with a second group of fresh seed fuel elements;

i) replacing the seed fuel elements in said third group of seed-blanket units at the end of a third seed fuel cycle with a third group of fresh seed fuel elements; and j) replacing said blanket fuel elements in each of said seed-blanket units in said first and second groups at the end of a blanket fuel cycle, said blanket fuel cycle having a time interval length which is independent of a time interval length of said seed fuel cycles.

17. The method of claim 16, further comprising the steps of replacing the seed fuel elements in said first group of seed-blanket units at the end of a fourth and a seventh seed fuel cycle with fresh seed fuel elements containing uranium enriched to said third level, replacing the seed fuel elements in said second group of seed-blanket units at the end of a fifth and an eighth seed fuel cycle with fresh seed fuel elements containing uranium enriched to said third level, and replacing the seed fuel elements in said third group of said seed-blanket units at the end of a sixth and ninth seed fuel cycle with fresh seed fuel elements containing uranium enriched to said third level.

18. The method of claim 17, wherein said step of replacing said blanket fuel elements further comprises replacing said blanket fuel elements in each of said seed-blanket units in said first, second and third groups at the end of the ninth seed fuel cycle.

19. The method of claim 16, wherein said first, second and third uranium enrichment levels are selected to be approximately 12% U-235 to 88% U-238, approximately 17% U-235 to 83% U-238, and approximately 20% U-235 to 80% U-238, respectively.

20. The method of claim 16, wherein said reactor core selected to be a conventional pressurized water reactor core, and each of said seed-blanket units selected to have a cross sectional shape which is either hexagonal or square.

* * * * *